US010294134B2

(12) United States Patent
Bock et al.

(10) Patent No.: US 10,294,134 B2
(45) Date of Patent: May 21, 2019

(54) SYSTEMS AND METHODS FOR ENHANCED FACULTATIVE BIOSOLIDS STABILIZATION

(71) Applicant: Aquaconeer, LLC, Panama City Beach, FL (US)

(72) Inventors: Albert Bock, Panana City Beach, FL (US); Stephen R. Wilson, Panama City Beach, FL (US)

( * ) Notice: Subject to any disclaimer, the term of this patent is extended or adjusted under 35 U.S.C. 154(b) by 514 days.

(21) Appl. No.: 14/734,753

(22) Filed: Jun. 9, 2015

(65) Prior Publication Data

US 2016/0115054 A1 Apr. 28, 2016

Related U.S. Application Data

(60) Provisional application No. 62/068,967, filed on Oct. 27, 2014.

(51) Int. Cl.

| | |
|---|---|
| ***C02F 3/00*** | (2006.01) |
| ***C02F 11/02*** | (2006.01) |
| ***C02F 11/04*** | (2006.01) |
| ***G05B 15/02*** | (2006.01) |
| *C02F 11/14* | (2019.01) |

(52) U.S. Cl.

CPC .............. *C02F 3/006* (2013.01); *C02F 11/02* (2013.01); *C02F 11/04* (2013.01); *G05B 15/02* (2013.01); *C02F 11/14* (2013.01); *C02F 2209/005* (2013.01); *C02F 2209/008* (2013.01); *C02F 2209/14* (2013.01); *C02F 2209/18* (2013.01); *Y02E 50/343* (2013.01); *Y02W 10/27* (2015.05)

(58) Field of Classification Search

CPC ...... C02F 3/006; C02F 3/308; C02F 2209/14; C02F 3/302; C02F 2209/15; C02F 2209/18; C02F 9/00; C02F 11/02; C02F 2209/44; C02F 3/301; C02F 11/04; C02F 11/12; C02F 3/30

USPC ........................................ 210/614, 605, 143

See application file for complete search history.

(56) References Cited

U.S. PATENT DOCUMENTS

| | | | | | |
|---|---|---|---|---|---|
| 7,416,669 | B1 * | 8/2008 | Carolan | C02F 3/006 | 210/614 |
| 2006/0086662 | A1 * | 4/2006 | Ogden | C02F 3/32 | 210/620 |
| 2010/0282654 | A1 * | 11/2010 | Hauschild | C02F 3/1268 | 210/151 |

(Continued)

*Primary Examiner* — Claire A Norris
(74) *Attorney, Agent, or Firm* — Paden E. Woodruff, IV

(57) ABSTRACT

A control system and method for digestion of waste activated sludge ("WAS") includes treating the WAS first at anaerobic conditions for≤ a fixed period of time and then at aerobic conditions for≤a fixed period of time prior to either dewatering or optional anoxic conditions followed by dewatering, supplying air to initiate aerobic conditions when a predetermined set point for maximum ammonium nitrogen has been reached within the fixed anaerobic time, and initiating dewatering or optional anoxic conditions followed by dewatering when a predetermined set point for minimum ammonium nitrogen and optional standards for vector and pathogen reduction are met within the fixed aerobic time, the method and system including monitoring either consumption of soluble alkalinity or orthophosphate reduction or both for maximum orthophosphate reduction within aerobic time.

21 Claims, 15 Drawing Sheets

(56) References Cited

U.S. PATENT DOCUMENTS

2013/0134092 A1* 5/2013 Mussari .................... C02F 9/00
210/620

* cited by examiner

SYSTEMS AND METHODS FOR ENHANCED FACULTATIVE BIOSOLIDS STABILIZATION

CROSS-REFERENCE TO RELATED APPLICATION

This application claims the benefit of U.S. Provisional Patent Application Ser. No. 62/068,967 filed Oct. 27, 2014, under 35 U.S.C. § 119(e) and entitled Apparatus for Measuring, Evaluating and Reporting the Nutrient Reduction of Phosphate and Ammonium in Digester Bio-solids by Controlling Digester Cycles, and incorporates this provisional application by reference in its entirety.

FIELD OF THE INVENTION

The invention relates to processes for biological wastewater treatment. More specifically, this invention relates to waste activated sludge generated in biological wastewater treatment plants and to systems and methods for biosolids stabilization.

BACKGROUND OF THE INVENTION

One example of biological wastewater treatment as commonly practiced is illustrated schematically at 20 in FIG. 1, which is labeled “Prior Art.” FIG. 1 is intended to be representative, not exhaustive, as there are many different ways to set up a plant for biological wastewater treatment. FIG. 1 is described immediately below to provide a context for the invention.

Influent raw wastewater 22 from a source thereof, including for example, a municipal sewage system, undergoes a mechanical separation in a process unit 23 called the “head works,” typically by bar screening and grit removal. Bar screening removes larger foreign objects including, for example trash and tree limbs and the like that may be swept along by the sewage as it is collected for delivery to the treatment plant. Grit is removed to keep fine particles from accumulating in the plant and clogging pipes and pumps. Raw wastewater may also be treated in a primary sedimentation tank, normally after the head works and not illustrated here, for a period of quiescent settling to allow greases, oils, and floating objects to be skimmed from the top as scum and to remove matter from the bottom that readily settles prior to entering reactor 26 for biological nutrient removal (BNR"). The screened wastewater 24 having grit removed and possibly having undergone primary sedimentation enters reactor 26 where the wastewater is mixed with an activated sludge for BNR treatment. The sludge comprises microbes that digest the organic carbonaceous content of the wastewater in the BNR process, often in at least one or more of a series of reactions characterized by the nature of the respiration of the microbes. Aerobic respiration occurs in the presence of dissolved oxygen, in which air as a source of oxygen typically is transferred through the mixture of sludge and wastewater. Aerobic conditions are also commonly referred to as “oxic” conditions. Anoxic respiration occurs when the dissolved oxygen has been consumed and only chemically bound oxygen remains. Anaerobic respiration occurs when there is no dissolved oxygen available and the chemically bound oxygen has been consumed. Many processes have been developed around these respiration conditions for biological nutrient removal in the activated sludge process.

For example, early BNR processes used only an aerobic BNR reactor. Later processes added an initial anoxic phase. The well-known and widely used Bardenpho process uses a four-stage sequence of anoxic, aerobic, anoxic, and aerobic reactions to treat wastewater and for nitrogen removal. The basic Bardenpho process was later modified to add an initial anaerobic zone as the first of five stages in what is commonly practiced today as a modified Bardenpho BNR process. Subsequent developments include a sequence of anaerobic and aerobic zones in which an anoxic zone is introduced. The initial anaerobic zone is considered generally to improve biological phosphorous removal in a BNR reactor.

Once biological nutrient removal has occurred, the mixture of wastewater and treated sludge 28 typically enters a clarifier 30 for gravity separation of the liquid fraction from the solids fraction. Following clarification, the clarifier releases the resulting liquid fraction 32, called “supernatant,” from the top of the clarifier for additional treatment prior to discharge. The clarifier discharges the activated sludge 34 from the bottom of the clarifier.

For further treatment, the clarified wastewater normally is filtered as illustrated at 36 to remove suspended solids. The filter backwash, 38, which comprises the filtered suspended solids, is returned to join the municipal or other source of wastewater and to re-enter the head works 23 in influent steam 22. Clarified and now filtered wastewater 40 may undergo ultraviolet (“UV”) radiation treatment 42 to reduce or eliminate contaminating microbes. Effluent treated wastewater 44 is removed from UV treatment unit 42. If the effluent treated wastewater meets standards for treatment, usually set out by operation of law, then the approved effluent 44 may be disposed of in fresh water lakes, used for irrigation, or other permitted purposes, including ultimately participating in the water cycle, further treatment for use as potable water, and perhaps to return another day to the influent 22 for biological nutrient removal. If the effluent treated wastewater 44 does not meet standards for treatment, then rejected effluent 46 can be diverted to a reject holding pond 48, ultimately to be returned as reject return flow 50 to join the municipal or other source of wastewater and to re-enter the head works 23 in influent steam 22.

Returning now to the clarifier 30, the solids fraction 34, comprising activated sludge, is normally taken from the bottom of the clarifier. The settled activated sludge stream 34 is separated into two streams, a return activated sludge stream (“RAS” stream) 52 for seeding the BNR reactor and the remainder of the sludge for disposal, a waste activated sludge stream (“WAS” stream) 54. Most plants generate some degree of waste activated sludge. When WAS 54 is obtained, which is the usual case for many biological wastewater treatment plants, then it typically is disposed of in one of two ways. One option is treat the WAS inline at the plant in a digester 56. Another option is simply to haul the WAS stream 54 offsite for further treatment or disposal in a land fill, as illustrated at 57. Offsite treatment or disposal is illustrated in dashed lines to indicate it is an option that may be practiced at some facilities. In some offsite treatments, the WAS stream 54 is treated by heat drying or chemical addition to produce Class AA solids for commercial purposes.

Untreated WAS and even digested activated sludge that otherwise does not meet minimum standards for stabilization cannot be used as fertilizer or otherwise disposed of in surface applications and is often buried in a landfill. If the sludge is to be disposed to a landfill rather than in a surface application, then often about the only requirement imposed is that the sludge pass a minimum dryness check to determine whether the WAS is sufficiently dewatered for disposal.

Additional benefits of hauling the WAS stream 54 away from the plant without inline downstream biosolids treatment is that liquid side streams produced by inline treatment are not returned to the influent to the plant and do not add to the nutrient loads treated in the BNR reactor 26. Side streams typically contain nitrogen from the production and breakdown products of ammonia, including ammonium, nitrates and nitrites; phosphorous in several soluble phosphate forms in the side stream liquid, including primarily reactive orthophosphate, condensed phosphates, including pyro, meta, and polyphosphates, and organic phosphates; and carbonaceous material, which material produces a demand for oxygen for respiration by microorganisms in the biological wastewater treatment process and is often called "biological oxygen demand" ("BOD" or "CBOD"). High rates of these substances in side streams can upset the balance of the ecological system in the BNR reactor, resulting in less efficient operation, difficulty meeting effluent permits, increased oxygen demands, increased additions of chemicals to remove nutrients not removed by the microbes, and increased costs of operation. Nevertheless, although numerous benefits readily appear for a biological waste water treatment plant in hauling excess activated sludge away from the plant instead of treating it inline, transport and disposal costs for WAS taken offsite offset perceived benefits in many cases.

Transport and disposal costs can be reduced by treating, dewatering, and recovering stabilized biosolids prior to transport in a process known as "sludge stabilization," which is commonly practiced. By "stabilizing" the biosolids, we mean at least the reduction of the organic content, which typically also reduces the concentration of pathogenic bacteria, the potential for sludge odor, and provides uniformity of sludge characteristics, including moisture content, in the recovered and stabilized biosolids.

If the stabilized biosolids are to be applied to land in the United States, as opposed to disposal in a landfill, then the biosolids are subject to regulations promulgated by the United States Environmental Protection Agency as set forth in Volume 40 of the Code of Federal Regulations, at Section 503, which are often referred to as "Class B biosolids standards." Class B biosolids standards require a minimum reduction in "vector attraction" and "pathogens." Pathogen reduction means that the biosolids are without significant coliform pathogens as defined by the federal regulations. Pathogen reduction is normally determined by the fecal coliform test. Reducing vector attraction means that the biosolids are not attractive to rodents and mosquitoes and the like vectors for disease transmission. Determining the degree of reduction in vector attraction includes ten (10) to twelve (12) different methods. One commonly used test for determining vector attraction reduction measures a parameter called "specific oxygen uptake reduction," known by the acronym "SOUR." Other countries or municipalities outside the United States may impose similar or related minimum requirements for surface disposal of stabilized biosolids and individual local municipalities may impose more stringent conditions. Some sites require a minimum biosolids content to satisfy local stringent regulations for dryness.

One of the more efficient current methods of sludge disposal, illustrated in FIG. 1, is to treat the WAS 54 downstream of the clarifier 30 and inline in a digester 56 at the biological wastewater treatment plant 20 where it originated and to dewater the digested sludge in a mechanical dewatering unit 58 for recovery of the stabilized biosolids 59. In plants incorporating sedimentation tanks for the raw sludge influent to the plant, called "primary sedimentation tanks," the raw primary sludge may be drawn from the tank and added to the WAS for treatment in the digester, which is not illustrated in FIG. 1.

The two primary solids stabilization systems are typically either anaerobic or aerobic digesters, although combinations of these two primary systems have been proposed. An aerobic digester is illustrated at 56. Hydrolysis of the WAS in the digester reduces the organic content of the sludge and the concentration of pathogens. The digested WAS 57 is pumped to a mechanical dewatering unit 58 to remove water from the sludge and recover the biosolids. The separated liquid fraction 60 from both anaerobic and aerobic digesters is normally returned to the influent to the plant from the dewatering unit as a side stream, and often results in nutrients, including nitrogen, phosphorous, and even sometimes CBOD being added to the source influent waste water 22 to enter the head works 23 and BNR reactor 26. Side streams 60 from aerobic digesters typically return phosphorous and nitrates, but not ammonium and CBOD due to aeration; side streams from anaerobic digesters typically return ammonium, CBOD, and phosphorous. It is beneficial for efficient nutrient removal in BNR reactor operation to produce a digester side stream for return to the influent that is low in phosphorous, ammonium and other forms of nitrogen, and CBOD. Return of the side stream can place additional demands on the BNR reactor and can overload the system so that additional treatments to remove nutrients have become somewhat routine and increase the cost of biological nutrient removal. Decanting the digester can exacerbate this problem. In decanting, the WAS is allowed to settle in the digester and the gravity-settled WAS provides a supernatant liquid fraction 61. The decanted supernatant liquid may be returned to the influent to the plant as a side stream or added to the side stream 60 and returned, as is illustrated in FIG. 1.

If the WAS 54 is treated in-line after clarification in an aerobic digester 56, then aeration devices including aerators and blowers and mechanical mixing devices 62 may typically run subject to control based on time, monitored dissolved oxygen ("DO"), monitored oxidation-reduction potential ("ORP"), or a combination of one or more of these. Alternatively, and somewhat commonly, the aeration and mechanical mixing devices may run manually in an uncontrolled fashion for from about 10 to 24 hours per day. After digestion, flocculating agent 63 is added inline to the digested biosolids 57 and the now-flocculated and digested bio-solids 57 are mechanically dewatered at 58.

Despite years of development, biological phosphorous removal still remains problematic. Conventional aerobic digester practice, including monitoring DO concentration, ORP, time, and using manual aeration control tends to lower the pH in the digester biosolids and to produce high orthophosphate phosphorous and nitrate nitrogen levels in the digester side streams. Fully 70% of the energy costs associated with operating a biological waste water treatment plant can be attributed to aeration, and blowers or surface aerators in the digesters are a significant source of these costs.

The relatively high energy requirement associated with oxygen transfer by adding air or another oxygen source and mixing the sludge to dissolve the air is the primary disadvantage typically attributed to the aerobic digestion process. Subsequent developments to reduce energy costs have included fine bubble air diffusion to increase oxygen transfer efficiency and increased temperatures for thermophilic operation, but each of these developments introduces additional issues. Another disadvantage in aerobic digestion of WAS is the high cost of chemical additions due to the soluble phosphorous and nitrate nitrogen concentrations in the digester side stream returned to the influent waste water. High nitrogen levels in the side stream produce yet additional challenges for nitrogen removal efficiency in the BNR reactor.

Excess phosphorous concentrations in the BNR, whether from aerobic or anaerobic digestion, typically result from the continual return of phosphorous to the BNR influent through digester side stream 60, typically predominated in the species of reactive orthophosphate $PO_4^{3-}$. Orthophosphate returned to the influent from the digester side stream tends to accumulate and eventually overloads the plant. Chemicals normally are added to the BNR reactor at the beginning or end of the reaction sequence to bind and precipitate the excess phosphorous so that it can be removed during sludge wasting with the stabilized biosolids. Chemical additions to the BNR reactor of aluminum sulfate, ferric sulfate, ferric chloride, or, somewhat less commonly, lime and the like chemicals, remove excess orthophosphate phosphorous, but also increase plant operating expenses.

It would be desirable to improve systems for biological nutrient removal in wastewater treatment, and especially to increase the efficiencies of the aerobic digester processes used to treat waste activated sludge.

SUMMARY OF THE INVENTION

The invention relates to a control system and method for precise aeration of waste activated sludge in a modified aerobic digester based on nutrient monitoring of waste activated sludge ("WAS") containing facultative microorganisms, which system reduces aeration costs in the digester; reduces nitrogen in the digester side stream; reduces orthophosphate in the digester side stream by precipitating otherwise soluble phosphate compounds into the biosolids, increasing the ability of the process to dewater the WAS and reducing biosolids processing time by up to 30 to 50% compared to conventional aerobic digestion; and provides a stabilized biosolids product of reduced organic content, volume, pathogens, and odor that optionally and typically is suitable for surface application as a fertilizer or other useful product, meeting Class B and other related biosolids standards as may exist in other countries.

The steps of the process include at least one cycle, and normally only one cycle, of sequential individual first anaerobic and then aerobic treatment cycles of WAS in a digester followed by dewatering provided certain parameters are met, recovery of the stabilized biosolids, and return to the plant influent of the digester side stream. In operation, the process relies on facultative microorganisms that can live and respire under both anaerobic conditions in the absence of oxygen and aerobic conditions in the presence of dissolved oxygen. Typically, the digester is seeded with these organisms by retaining sufficient biosolids in the digester after dewatering in the immediately prior cycle.

In one embodiment, the control system and method include the steps of initiating anaerobic conditions in the sludge, initiating aerobic conditions in the sludge in response to either a predetermined maximum ammonium concentration or a predetermined maximum anaerobic time monitored by the control system, and dewatering the sludge to provide stabilized biosolids in response to a predetermined minimum ammonium concentration and under monitored conditions to substantially limit increase in the concentration of reactive phosphorous species in solution. Typically, practice of the invention enables about a 95% precipitation of the reactive orthophosphate liquid-fraction phosphorous into the biosolids, returning an insignificant amount of the orthophosphate phosphorous to the influent. The system and steps of the method of the invention can be practiced in connection with aerobic digesters modified in accordance with the invention as well by modification of an anaerobic digester in a manner that should become apparent to the skilled artisan made aware of the invention as described herein, although modification of an aerobic digester does not typically require the installation of aeration devices and anaerobic digesters typically do.

The invention is based on multiple factors, at least one of which in part is the recognition that biological nutrient removal and digestion are different processes, despite employing somewhat similar overall reactions. Biological nutrient removal ("BNR") reactors, and the control systems and reaction conditions used in connection with BNR reactors work to grow microorganisms to treat raw wastewater. An initial anaerobic zone is considered generally to improve biological phosphorous removal in a BNR reactor. In sharp contrast, WAS digesters work to destroy excess microorganisms and reduce the amount of biosolids for disposal. An initial anaerobic zone is not expected to improve biological phosphorous removal in a digester, as can be seen in prior digesters that combine anaerobic and aerobic cycles, but without the method or control system of the invention. Indeed, phosphorous is not removed at all in a digester. Instead the invention relies upon the presence of soluble alkalinity to improve precipitation of reactive phosphates in the liquid phase onto the biosolids for removal and without being returned to the BNR reactor, among other improvements in digester methods and controls. Overall, the total amount of phosphorous in the liquid and solid phases together remains about the same.

The process is started with the anaerobic cycle, symbolized herein and in the accompanying drawings by Ø for "no oxygen," when the WAS enters the digester and is maintained under anaerobic conditions. The anaerobic cycle takes from about two (2) to ≤forty (40) days to complete and generates ammonia, $NH_3$, by the breakdown of organic cellular compounds, which is predominantly present in wastewater as the ammonium ion, $NH_4^+$, and is by monitoring this ion that ammonia concentration generally is determined. The ionized form of ammonia, $NH_4^+$, predominates over ammonia, $NH_3$, at mildly acidic conditions. The end of the anaerobic cycle is determined by monitoring empirically determined set points for maximum ammonium achieved within a maximum anaerobic cycle time, and then a source of oxygen, usually air, is supplied to initiate the aerobic cycle.

The aerobic cycle reduces the concentration of ammonia by oxidation of ammonium to nitrites, $NO_2^-$, and then to nitrates, $NO_3^-$, in the well-known process called nitrification. The aerobic cycle typically takes from about fifteen (15) to ≤forty (40) hours to complete. The aerobic cycle also results in the uptake of phosphorous into the biosolids, typically by adsorption of a calcium phosphate precipitate of orthophosphate, $PO_4^{3-}$, rather than allowing the orthophosphate to remain in solution to be returned to the plant influent in a digester side stream or decant stream, thus promoting little to no chemical addition to the digester to drive orthophosphate precipitation.

The end of the aerobic cycle and the initiation of dewatering is determined by monitoring set points for the reduction of ammonium to a minimum concentration achieved within a maximum aerobic cycle time. In addition, the process steps monitor one or both of reduction of orthophosphate concentration to a predetermined minimum and whether there is sufficient soluble alkalinity adequate to drive orthophosphate precipitation against an end point after which a reduction in orthophosphate concentration can no longer be achieved aerobically. If aerobic cycle time remains after ammonium has been reduced to the set point minimum, then the aerobic cycle is continued if minimum orthophosphate concentration has not yet been achieved or if the end point of soluble alkalinity has not been met. It is also desirable to monitor and, if required, and this is perhaps the usual case, whether Class B biosolids standards have been met in the aerobic cycle. Dewatering, which takes from about one (1) to ≤5 (five) days, is initiated under minimally aerobic conditions.

The control system of the invention that is applied to the steps includes monitoring the concentration of ammonium nitrogen, [$NH_4^+$—N], in both the anaerobic production and aerobic reduction cycles against a maximum set point in the anaerobic cycle, [$NH_4^+$—N]$_{max}$, and against a minimum set point in the aerobic cycle, [$NH_4^+$—N]$_{min}$. Time and ammonium concentration provide the primary control factors. Additionally, the control system monitors time, T, against set points for maximum time in each cycle. Maximum cycle time, $T_{max}$, is empirically determined for each cycle and monitored to provide precise aeration control, as T-$Ø_{max}$ for the anaerobic cycle in the absence of oxygen, in the aerobic cycle as T-$O_{max}$, in an optional anoxic cycle as T-$AN_{max}$, and in the dewatering cycle as T-$D_{max}$. In the aerobic cycle, the control system can monitor at least one of the end point, E.P., for soluble alkalinity, usually determined as the concentration of soluble calcium carbonate, expressed as [$CaCO_3$], or the concentration of reactive phosphates that can be removed by precipitation, which is orthophosphate, against a set point for minimum orthophosphate expressed as [$PO_4^{3-}$—P]$_{min}$. The precipitation of orthophosphate is driven by the presence of sufficient soluble alkalinity to form the precipitate that can be adsorbed onto the biosolids and removed from the BNR process. Thus, monitoring each of the end point for soluble alkalinity and the concentration of orthophosphate against a set point minimum presents advantages in the practice of the invention.

The aerobic cycle produces nitrates as a product of oxidizing ammonium, so as the ammonium concentration decreases, the concentration of nitrates, [$NO_3^-$], increases. For plants meeting more stringent requirements for nitrogen removal, the practice of the invention may include an alternative anoxic cycle after the aerobic cycle. Anoxic conditions denitrify, or reduce, nitrates, through a series of denitrification products, ultimately to harmless nitrogen gas. In the optional anoxic cycle, the control system monitors decrease in the concentration of nitrates against a minimum set point, [$NO_3^-$—N]$_{min}$.

The control system also monitors whether the orthophosphate concentration, [$PO_4^{3-}$—P], increases during dewatering. If too much air is added during dewatering, the equilibrium of the system may be altered to favor orthophosphate release into the liquid fraction after adsorption on the biosolids, thus compromising removal of orthophosphate from the digester side stream and decant liquid from the digester.

The control system provides precise control over aeration. The aerobic cycle is initiated by supplying oxygen to the WAS at the set point for maximum anaerobic cycle time, T-$Ø_{max}$, or prior to T-$Ø_{max}$ if the set point for [$NH_4^+$—N]$_{max}$ is met. If [$NH_4^+$—N]$_{max}$ has not been met and T-$Ø_{max}$ is exceeded, then the system informs the operator of inadequate ammonium production and biosolid hydrolysis.

Dewatering is initiated under minimally aerobic conditions when the set points for [$NH_4^+$—N]$_{min}$ and [$PO_4^{3-}$—P]$_{min}$ have both been met within the maximum aerobic ("O" for "oxic") cycle time, T-$O_{max}$. If T-$O_{max}$ is exceeded and the set point for [$PO_4^{3-}$—P]$_{min}$ has not been reached, but the set point for [$NH_4^+$—N]$_{min}$ has been met, then the process proceeds to dewatering and the system informs the operator. The operator can determine on a case-by-case basis whether to add lime or other sources of alkalinity to the digester in a subsequent anaerobic cycle to increase the precipitation of reactive phosphates in the aerobic cycle. In normal operation, the process of the invention can accommodate occasional insults of orthophosphate in the side stream without increasing orthophosphates in the plant effluent, so the process normally does not require adding sources of alkalinity. Chemical additions to the BNR reactor for phosphorous removal should not be necessary under most conditions.

If T-$O_{max}$ is exceeded and [$NH_4^+$—N]$_{min}$ has not been reached, which is a relatively rare event that can sometimes happen in winter if the sludge drops to ≤about 8° C. (46° F.), then the system notifies the operator and the anaerobic cycle is initiated a second time by turning off the source of oxygen to repeat the process. If after the second cycle, T-$O_{max}$ is exceeded and [$NH_4^+$—N]$_{min}$ has not been reached, which should typically not occur at all, then the system notifies the operator and the operator can determine on a case-by-case basis whether to initiate a third or later anaerobic cycle or to continue the second aerobic cycle.

Once the system proceeds to dewatering, then the time of dewatering is monitored against a maximum set point, typically 5 days, as T-$D_{max}$. If T-$D_{max}$ is likely to be exceeded, then the rate of dewatering is increased. If release of $PO_4^{3-}$ is detected, then the minimal air or other oxygen source is further reduced. Dewatering produces stabilized biosolids for use or disposal and a digester side stream for return to the plant influent. Any or all of time T, maximum ammonium nitrogen [$NH_4^+$—N]$_{max}$, minimum ammonium nitrogen [$NH_4^+$—N]$_{min}$, minimum orthophosphate [$PO_4^{3-}$—P]$_{min}$, orthophosphate release [$PO_4^{3-}$—P]$_{increase}$, and, if desired, the soluble alkalinity end point and nitrate nitrogen, [$NO_3^-$—N], can be monitored automatically and with nutrient analyzers continuously or only during the cycle of interest or empirically determined and monitored manually, as desired.

In yet additional embodiments of the invention, the control system optionally monitors Class B biosolids standards in the aerobic cycle along with [$NH_4^+$—N]$_{min}$, [$PO_4^{3-}$—P]$_{min}$, T-$O_{max}$, and optionally soluble alkalinity and nitrate nitrogen [$NO_3^-$—N]. If Class B standards are required, then a set point for Class B also provides primary control along with time and ammonium concentration, independent of ammonium concentration and of equal importance. Biosolids standards are normally monitored manually by operator approval based on empirically determined laboratory analysis, and the operator inputs the result to the control system. In the United States, the Class B standards provide stabilized biosolids that meet United States Environmental Protection Agency federal regulations set forth in Volume 40 of the Code of Federal Regulations, at Section 503. These federal regulations, referred to herein as "Class B biosolids standards" or "Class B standards," or simply as "Class B,"

require that the biosolids meet requirements for "vector attraction reduction and pathogen reduction," meaning that the stabilized bio-solids are not attractive to rodents and mosquitoes and the like vectors for disease transmission and are without significant pathogens as defined by the federal regulations, respectively, typically below $2\times10^6$ fecal coliform per gram of WAS as determined by the most probable number method ("MPN" method). Class B biosolids can be used or disposed of in surface applications, including as fertilizer.

Similar to the monitoring of $[NH_4^+—N]_{min}$ as described above, dewatering is initiated under minimally aerobic conditions when the set points for Class B biosolids standards, $[NH_4^+—N]_{min}$, and $[PO_4^{3-}—P]_{min}$ have all three been met within the maximum aerobic cycle time, $T\text{-}O_{max}$. If $T\text{-}O_{max}$ is exceeded and the set point for $[PO_4^{3-}—P]_{min}$ has not been reached, but the set point for Class B and for $[NH_4^+—N]_{min}$ have each been met, then the process proceeds to dewatering and the system notifies the operator. The operator can determine on a case-by-case basis whether to add lime or other sources of alkalinity to a subsequent anaerobic cycle, as discussed in the above embodiment. If the set points for $[NH_4^+—N]_{min}$ and Class B have been met, but that for $[PO_4^{3-}P]_{min}$ has not yet been met, and the cycle time, $T\text{-}O_{max}$ has still not been exceeded, then the aerobic cycle can be continued instead of proceeding to dewatering.

If $T\text{-}O_{max}$ is exceeded and either Class B biosolids standards have not been met or $[NH_4^+—N]_{min}$ has not been met, considered independently, then the system notifies the operator so that the anaerobic cycle is initiated a second time by turning off the source of oxygen to repeat the process. If after the second cycle, $T\text{-}O_{max}$ is exceeded and either Class B biosolids standards have not been met or $[NH_4^+—N]_{min}$ has not been met a second time, considered independently, which should typically not occur at all, then the system notifies the operator and the operator can determine on a case-by-case basis whether to initiate a third or later anaerobic cycle or to continue the second aerobic cycle.

In yet another embodiment, in addition to or in place of monitoring $[PO_4^{3-}—P]_{min}$ in the aerobic cycle, the system can monitor soluble alkalinity to track the end point for precipitation of orthophosphate. If soluble alkalinity is monitored without reference to the concentration of orthophosphate, then monitoring only the end point of soluble alkalinity provides an indication that no further precipitation will take place and does not indicate the actual concentration of orthophosphate. If the system is within $T\text{-}O_{max}$ and the end point for soluble alkalinity has been reached then no further continuation of aerobic conditions will precipitate more orthophosphate and the system can proceed to dewatering if the set point for $[NH_4^+—N]_{min}$ is met, or the set points for both Class B and $[NH_4^+—N]_{min}$ have independently been met in embodiments where Class B standards are also monitored. If $T\text{-}O_{max}$ is not exceeded and soluble alkalinity has not reached its endpoint, then the aerobic cycle can be continued until $T\text{-}O_{max}$ is exceeded.

In some embodiments, it is advantageous to monitor both soluble alkalinity and $[PO_4^{3-}—P]_{min}$ in the aerobic cycle. Under these conditions, if the end point for soluble alkalinity is met, then the operator can obtain a value for $[PO_4^{3-}—P]$, either manually or via the control system. If $[PO_4^{3-}—P]_{min}$ has not been met and the end point for soluble alkalinity has been met, then the system notifies the operator that no further precipitation of orthophosphate is possible and the operator can determine on a case-by-case basis whether to add lime or other sources of alkalinity to a subsequent anaerobic cycle, as previously set forth.

In still yet a further embodiment, if desired, the system can track the rate of reduction of organic carbonaceous material in the anaerobic cycle. Knowing the organic reduction rate can enable a generally accurate indication of whether Class B or similar standards, including those used outside the United States, are likely to be met in the aerobic cycle. Ammonia production in the anaerobic cycle is proportional to the reduction in total organic carbonaceous compounds, TOC. Generally speaking, it is useful to know the ratio of ammonia production to TOC, which is generally empirically determined and specific to each plant. Then, at the end of the anaerobic cycle, when the concentration of ammonium nitrogen, $[NH_4^+—N]$ produced in the anaerobic cycle is known, that number can be multiplied by the ratio to provide a percentage reduction in TOC. For example, if the ratio for a particular plant is 0.7 and the $[NH_4^+—N]$ produced in the anaerobic cycle is 50 mg/l. then the operator knows that about a 35% reduction in TOC has occurred and that the Class B standards are likely to be met.

In yet another embodiment, an anoxic cycle, typically of ≤12 hours duration, can be added to the process between the oxic aerobic cycle and the dewatering cycle to further reduce nitrogen in the side streams generated by the digester. Plants having stringent low nitrogen requirements or otherwise having difficulty removing nitrogen may use such an embodiment. In the anoxic cycle, no more, or very little dissolved oxygen remains in the wastewater and the facultative microorganisms rely on chemically bound oxygen for respiration under anoxic or mixed anoxic conditions. Under anoxic conditions, the nitrate nitrogen, $NO_3^-—N$, produced in the aerobic cycle by the oxidation of ammonia to nitrites, $NO_2^-$ and then the oxidation of nitrites to nitrates, is reduced through denitrification. To terminate the aerobic cycle and initiate denitrification in the anoxic cycle, it is necessary to add carbonaceous biological oxygen demand (CBOD) to the WAS. The amount of BOD addition needs to be carefully controlled to avoid returning high CBOD levels in the digester side stream to the plant influent and is generally determined by the concentration of nitrate nitrogen $[NO_3^-—N]$ at the beginning of the anoxic cycle or the end of the aerobic cycle.

In the optional anoxic cycle, the control system of the invention monitors the reduction in the concentration of nitrate nitrogen $[NO_3^-—N]$ against a set point $[NO_3^-—N]_{min}$ and against a maximum anoxic cycle time, $T\text{-}AN_{max}$. If the set point for $[NO_3^-—N]_{min}$ is met and the set point for $T\text{-}AN_{max}$ is either met or not yet met, then the anoxic cycle is terminated and the process proceeds to dewatering under minimally aerobic conditions, as previously described. If the set point for $T\text{-}AN_{max}$ is exceeded, but the set point for $[NO_3^-—N]_{min}$ is not yet met, then the operator is notified and can make a decision on a case-by-case basis whether to continue the anoxic cycle or proceed to dewatering. Generally speaking, no further CBOD is added to the WAS beyond that added to initiate the cycle and determined based on $[NO_3^-—N]$ at the beginning of the anoxic cycle or the end of the aerobic cycle.

Thus, the invention provides, among other things, a control system and method for sludge stabilization in connection with biological waste water treatment that improves the reduction of nitrogen and orthophosphate in the digester side stream returned to the influent. The system and method comprise the steps of: providing WAS to a digester; monitoring the concentration of ammonium nitrogen, orthophosphate, and optionally soluble alkalinity, nitrate nitrogen, and Class B biosolids standards in the sludge; establishing first anaerobic conditions in the sludge; terminating the anaerobic conditions by introducing air to the WAS and establishing aerobic conditions; selecting one of terminating the aerobic conditions by adding CBOD to the WAS based on the nitrate nitrogen concentration, $[NO_3^-—N]$, at the beginning of the anoxic cycle or the end of the aerobic cycle and dewatering the anoxic treated sludge under minimally aerobic conditions or dewatering the sludge after the end of the aerobic cycle; and monitoring the time of each cycle against a set point maximum, the control system terminating anaerobic conditions and initiating aerobic conditions based on $[NH_4^+—N]_{max}$ and $T\text{-}Ø_{max}$; terminating aerobic conditions and initiating dewatering or optional anoxic conditions prior to dewatering based on $[NH_4^+—N]_{min}$, $T\text{-}O_{max}$, and optionally Class B standards in the aerobic cycle, along with control features to determine whether to end the aerobic cycle before $T\text{-}O_{max}$ is exceeded or to provide notifications in the event $T\text{-}O_{max}$ is exceeded for $[NH_4^+—N]_{min}$, optional Class B biosolids standards, $[PO_4^{3-}—P]_{min}$, and the optional soluble alkalinity, $[CaCO_3]$.

BRIEF DESCRIPTION OF THE DRAWINGS

The foregoing and other advantages and features of the invention and the manner in which the same are accomplished are set forth in the following detailed description taken in conjunction with the accompanying drawings, which illustrate preferred and exemplary embodiments and in which:

FIG. 10 illustrates continuation of the aerobic cycle wherein aerobic cycle time ($T\text{-}O_{max}$) has not been exceeded and any one of the monitored parameters have not been satisfied for ammonium nitrogen $[NH_4^+—N]_{min}$ or Class B biosolids standards, considered independently, and wherein the end point of $CaCO_3$ soluble alkalinity has been reached so continuing the aerobic cycle will not further reduce the concentration of orthophosphate phosphorous $[PO_4^{3}—P]_{min}$;

FIG. 11 illustrates termination of the aerobic cycle (O) and progression under alarm conditions to either the optional anoxic cycle (AN), FIG. 3, or the dewatering cycle (D), FIG. 3, wherein the set point has been exceeded for aerobic cycle time ($T\text{-}O_{max}$), the set points have been met for oxidation of ammonium nitrogen $[NH_4^+—N]_{min}$ and for Class B biosolids standards, and the set point has not been reached for reducing the concentration of orthophosphate phosphorous $[PO_4^{3-}—P]_{min}$;

FIG. 12 illustrates termination of the aerobic cycle (O) and initiation of anaerobic conditions for a second time under alarm conditions, most commonly when the temperature of the waste activated sludge falls below about 8° C. (46° F.) and in the event the set point has been exceeded for aerobic cycle time ($T\text{-}O_{max}$) and the set points still have not been met for either oxidation of ammonium nitrogen $[NH_4^+—N]_{min}$ or for Class B biosolids standards, considered independently;

FIG. 13 illustrates the termination of the aerobic cycle (O) and initiation of anaerobic conditions for a rare third or even a subsequent anaerobic cycle (Ø) under alarm conditions in the event the set point has been exceeded for aerobic cycle time ($T\text{-}O_{max}$) and the set points still have not been met for either oxidation of ammonium nitrogen $[NH_4^+—N]_{min}$ or for Class B biosolids standards, considered independently;

FIG. 14 illustrates application of the control system of FIG. 4 to the aerobic cycle (O) of FIG. 3 wherein cycle time ($T\text{-}O_{max}$) has not been exceeded, the end point for the reduction in concentration of calcium carbonate $[CaCO_3]$ soluble alkalinity may or may not have been met as the case may be, the set point is not monitored for orthophosphate phosphorous $[PO_4^{3-}—P]_{min}$, and the set points have been met for oxidation of ammonium nitrogen $[NH_4^+—N]_{min}$ and for Class B biosolids standards. Under these circumstances, then if the end point for soluble alkalinity, $[CaCO3]_{E.P.}$, has been reached as illustrated by the solid line, then the aerobic cycle progresses to either the optional anoxic cycle (AN), FIG. 3, or the dewatering cycle (D), FIG. 3, as the case may be, because continuing the aerobic cycle would not further reduce orthophosphate concentration $[PO_4^{3-}—P]$, whereas if the end point for soluble alkalinity, $[CaCO3]_{E.P.}$, has not been reached as illustrated by the dashed line, then the aerobic cycle is continued.

Figure 1:
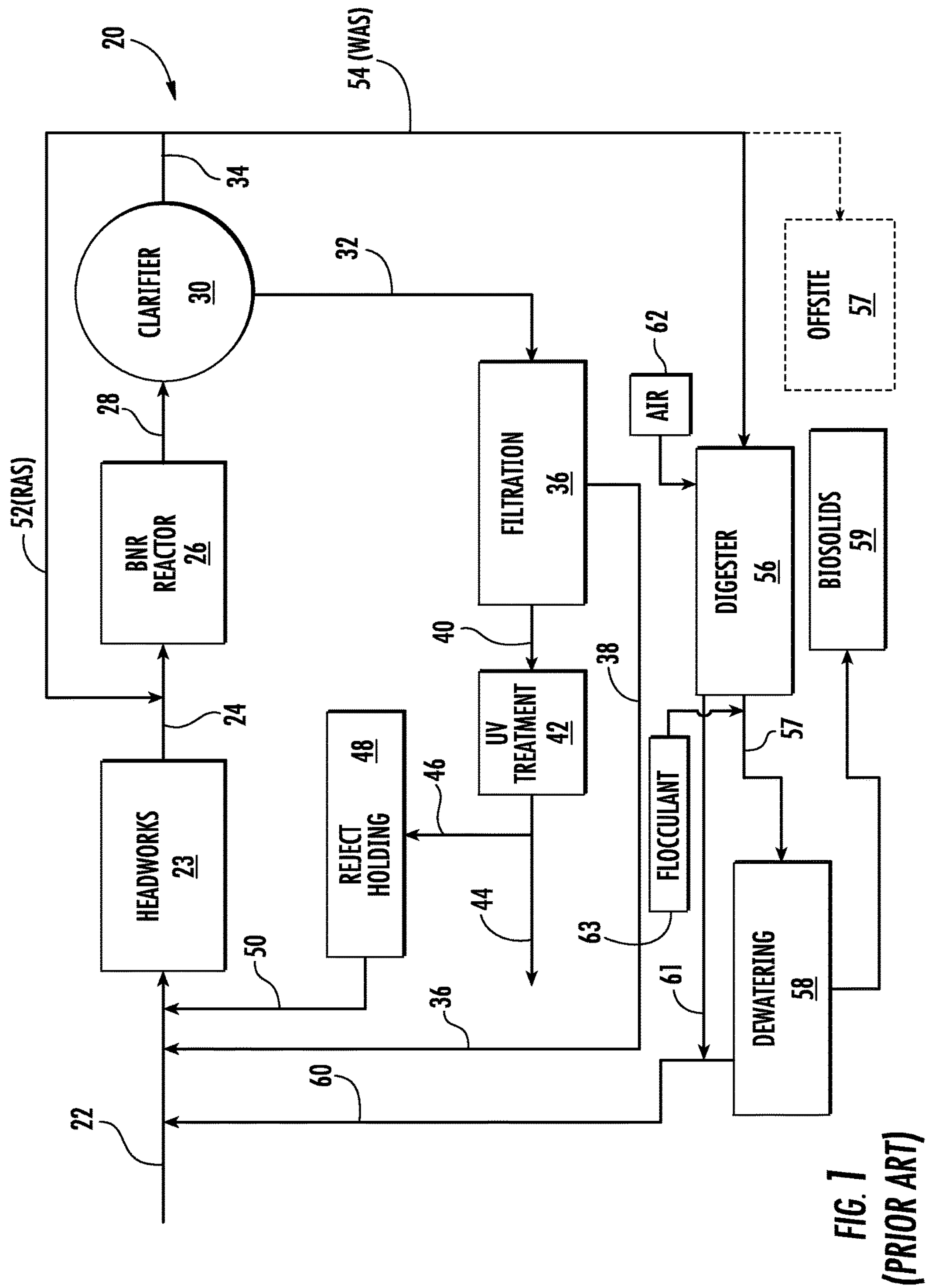
FIG. 1, labelled "Prior Art," illustrates a representative schematic of a wastewater treatment plant for biological nutrient removal.

Corresponding reference characters indicate corresponding parts throughout the several views of the drawings. Related, but not identical apparatus or features and steps typically are indicated by the use of primes. In some views of the drawings, multiple steps or features or process control scenarios depending on differences in monitored conditions sometimes are indicated in a single drawing for convenience as the case may be. The reader is referred to the Detailed Description below for clarification.

DETAILED DESCRIPTION

The invention can best be understood with reference to the specific embodiments that are illustrated in the accompanying drawings and in the variations described below. While the invention will be so described, it should be recognized that the invention is not intended to be limited to the embodiments illustrated in the drawings; rather, the embodiments provided in this disclosure are intended to satisfy applicable legal requirements. The invention includes all alternatives, modifications, and equivalents that may be included within the scope and spirit of the invention as defined by the appended claims.

Biological wastewater treatment, including bio-solids stabilization, is described generally and schematically in the context of FIG. 1, labeled "Prior Art" in the above background of the invention and should be referred to for context. For purposes of the detailed discussion, the aerobic digester 56 in FIG. 1 may be considered to be replaced in FIG. 2 with modified digester 56' of the invention and the control system 120 (FIG. 4) as described below. It should be recognized that digester 56' is not intended to be limited to the wastewater treatment process illustrated in FIG. 2 and is of broader application.

Figure 2:
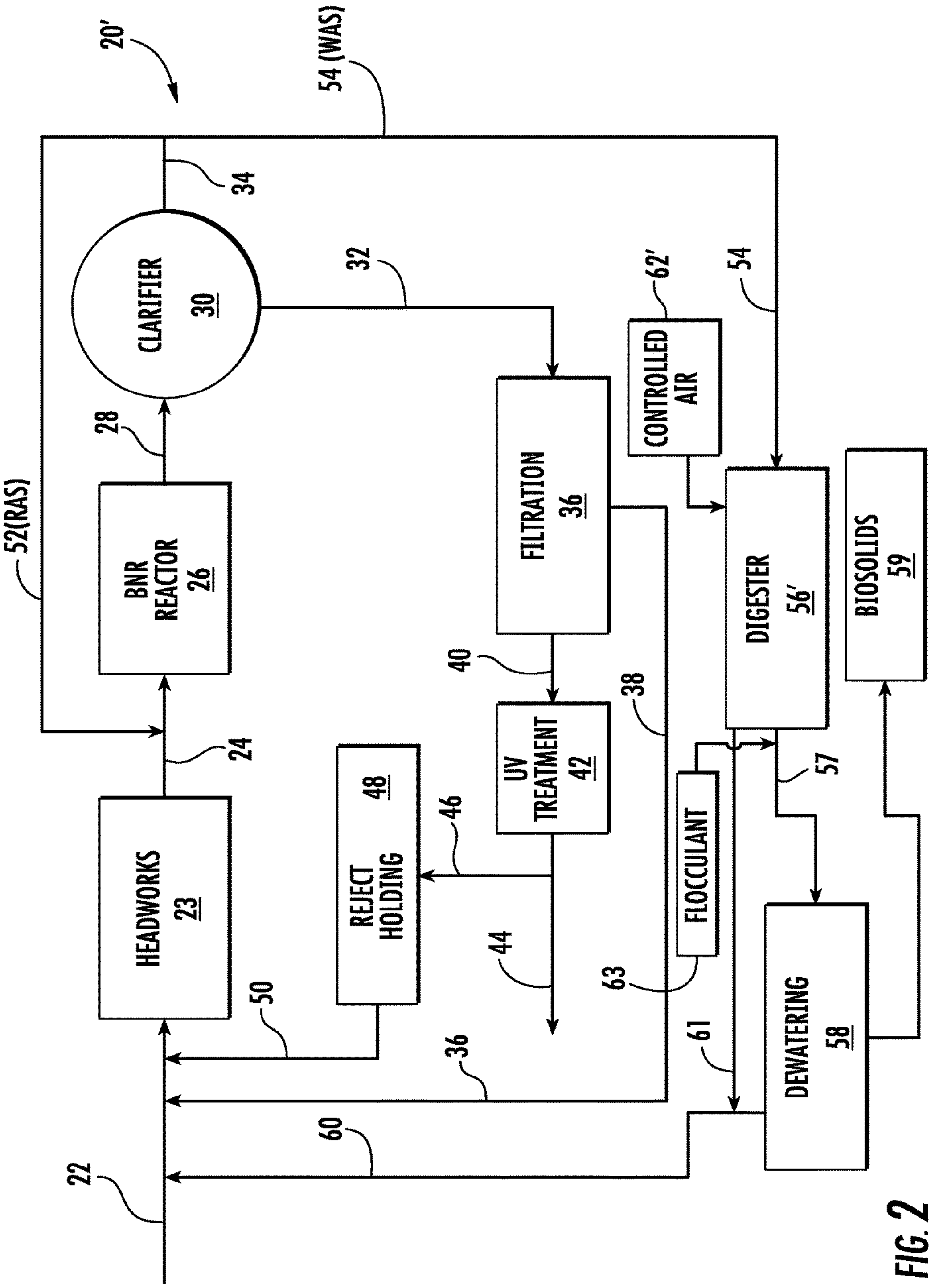
FIG. 2 illustrates a schematic of a representative wastewater treatment plant of the invention similar to that of FIG. 1 and in which numbers of individual features that correspond and are not necessarily identical to those of FIG. 1 are indicated by the use of primes.

FIG. 2 illustrates generally at 20' and in highly schematic form an exemplary and representative plant for biological wastewater treatment similar to that of FIG. 1, but including a modified digester 56' operated and controlled in accordance with the invention. The single digester tank 56 of FIG. 1 was modified in accordance with the practice of the invention to an aerobic digester 56' (FIG. 2) having a control system 120 (FIG. 4) based on monitoring the nutrients ammonium $NH_4^+$, nitrate $NO_3^-$, orthophosphate $PO_4^{3-}$, and soluble alkalinity, along with Class B bio-solids standards, and time T. Remaining portions of FIG. 2 are similar to those of FIG. 1 and to the general discussion of which the reader may be referred in the "Background of the Invention." However, it should be recognized that the introduction of the modified aerobic digester 56' and the control system of the invention described below and with reference to FIGS. 3 through 15 fundamentally changes the operation of the plant and the characteristics of the waste water in the BNR reactor 26, the waste activated sludge ("WAS") 54 leaving the clarifier 30, and especially digester side stream 60 and the stabilized bio-solids 59. Digester side stream 60 can be expected to be greatly reduced in the amount of ammonium $NH_4^+$, nitrate $NO_3^-$, orthophosphate $PO_4^{3-}$, and carbonaceous biological oxygen demand ("CBOD") returned to the BNR reactor 26. Stabilized bio-solids 59 can be expected to be loaded with precipitated calcium phosphate phosphorous and normally readily to meet United States Environmental Protection Agency ("EPA") federal regulations for land surface applications as set forth in Volume 40 of the Code of Federal Regulations, at Section 503 ("Class B bio-solids standards," normally for vector attraction reduction and pathogen reduction). No or very little chemical addition should typically be required to BNR reactor 26 or in the anaerobic cycle of the digester for phosphorous removal. Under certain conditions, discussed below, the amount of phosphorous returned to the BNR reactor may increase if orthophosphate is released into the side stream, and temporary or occasional insults by $PO_4^{3-}$ can typically be tolerated without chemical addition, the BNR reactor 26 having some ability to absorb an occasional small increase in phosphorous in the absence of an adverse impact on performance and on phosphorous concentrations in the effluent 44.

Figure 3:
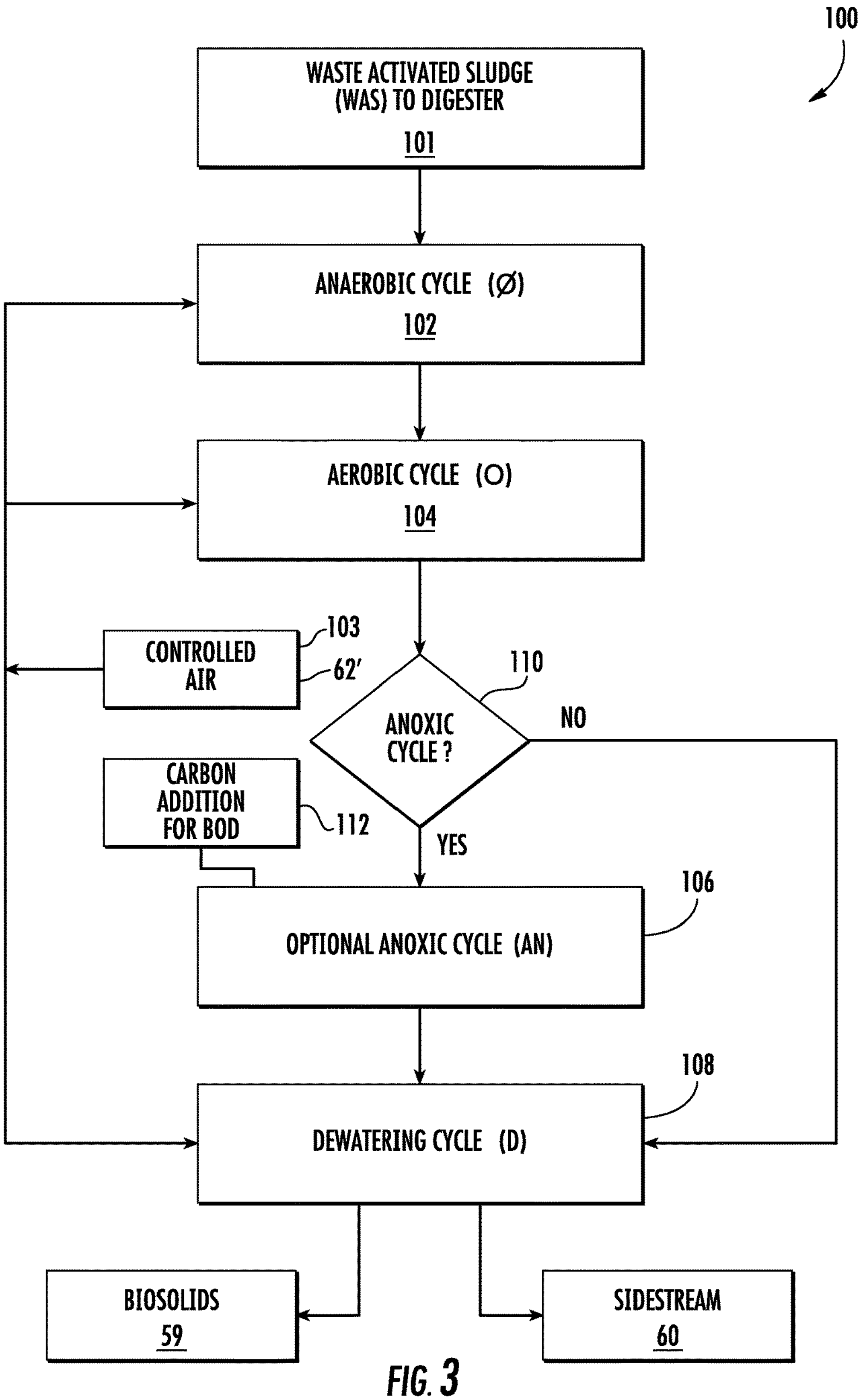
FIG. 3 illustrates an overall process flow diagram of waste activated sludge digestion in accordance with the invention.

FIG. 3 illustrates generally at 100 a flow diagram for the steps of operation of a modified aerobic digester 56' (FIG. 2) of the invention. Digester 56' is operated in batch flow mode under facultative conditions, which are usually at an ambient temperature of from about 5 to 40° C., through anaerobic, aerobic, optional anoxic, and minimally aerobic dewatering cycles 102, 104, 106, and 108 respectively. Waste activated sludge ("WAS") 54 enters the digester 56' (FIG. 2), step 101 (FIG. 3). The WAS may alternatively be mixed with raw sludge pumped from a primary settling tank as well, which is not illustrated, and it should be recognized that in referring to WAS herein, mixtures of WAS and raw sludge from primary sedimentation are to be included and not excluded from the practice of the invention.

The WAS or the mixture of WAS and raw sludge from primary sedimentation is treated in an initial step 102 at anaerobic conditions. In the anaerobic cycle 102, microbes engage in respiration in the absence of oxygen ("Ø"), break down the organic WAS cellular content by hydrolysis, and create ammonia, $NH_3$, from the broken down mass, which ionizes in solution to ammonium, $NH_4^+$. Bursts or short increments of controlled air 62' can be provided in the anaerobic cycle without disturbing the anaerobic cycle or initiating aerobic conditions to destroy methane-producing bacteria that may be formed under anaerobic conditions, as is described in more detail below.

The control system 120 (FIG. 4) provides precisely controlled air 62' or another controlled source of oxygen to the digester to provide oxic conditions ("O") to end the anaerobic cycle 102 and initiate the aerobic cycle 104. In the aerobic cycle 104, the concentration of ammonium is reduced by oxidative nitrification of the ammonium, first to nitrites, $NO_2^-$, and then to nitrates, $NO_3^-$. In addition, orthophosphate reacts with soluble alkalinity, measured as $CaCO_3$ to form precipitates of calcium phosphates that are adsorbed onto the biosolids and can be removed via sludge wasting upon dewatering.

In the practice of the invention, oxidation reduction potential ("ORP") can be monitored in addition to ammonium, if desired, but the ammonium concentration and not ORP is used to control the length of the anaerobic and aerobic cycles precisely and efficiently, reducing power requirements for operating the digester, in which the aeration and mixing devices are otherwise left on longer than necessary, even with ORP monitoring. ORP control does not effectively analyze when the desired minimum orthophosphate concentration is met or when the soluble alkalinity buffer is depleted to its end point. Orthophosphate reduction and depletion of alkalinity buffer is determined by separately monitoring their concentration in the WAS in the digester, apart from ammonium or ORP.

Unless an optional anoxic cycle 106 has been added to the system, then once the aerobic cycle is ended, the system progresses to dewatering, step 108, denoted as (D). Dewatering is accomplished at minimally aerobic conditions and the air 62' or other source of oxygen to the digester can be reduced even further to keep phosphorous bound to the biosolids as a precipitate if orthophosphate release is detected during dewatering. The cycle should not take more than five (5) days and adjustments to increase the dewatering rate may need to be made if it appears the cycle may last longer. Dewatering produces dewatered stabilized biosolids 59 and a liquid fraction side stream 60, FIGS. 2 and 3.

FIG. 3 also illustrates optional anoxic cycle 106, which is initiated upon completion of the aerobic cycle by adding CBOD 112 to the sludge depending on the nitrate nitrogen concentration [$NO_3^-$—N] at the beginning of the anoxic cycle or the end of the aerobic cycle and turning off the air 62' to allow dissolved oxygen to be depleted and anoxic or mixed anoxic conditions to prevail in the digester. It should be recognized that a determination or not 110 to initiate an anoxic cycle 106 is typically made before the process is even run, depending on stringent requirements for nitrogen in the effluent or other problems meeting nitrogen limits. Once the anoxic cycle 106 is completed, then the process proceeds to the next step of dewatering 108 and production of biosolids 59 and a side stream 60 as described above in connection with dewatering after the aerobic cycle.

Figure 4:
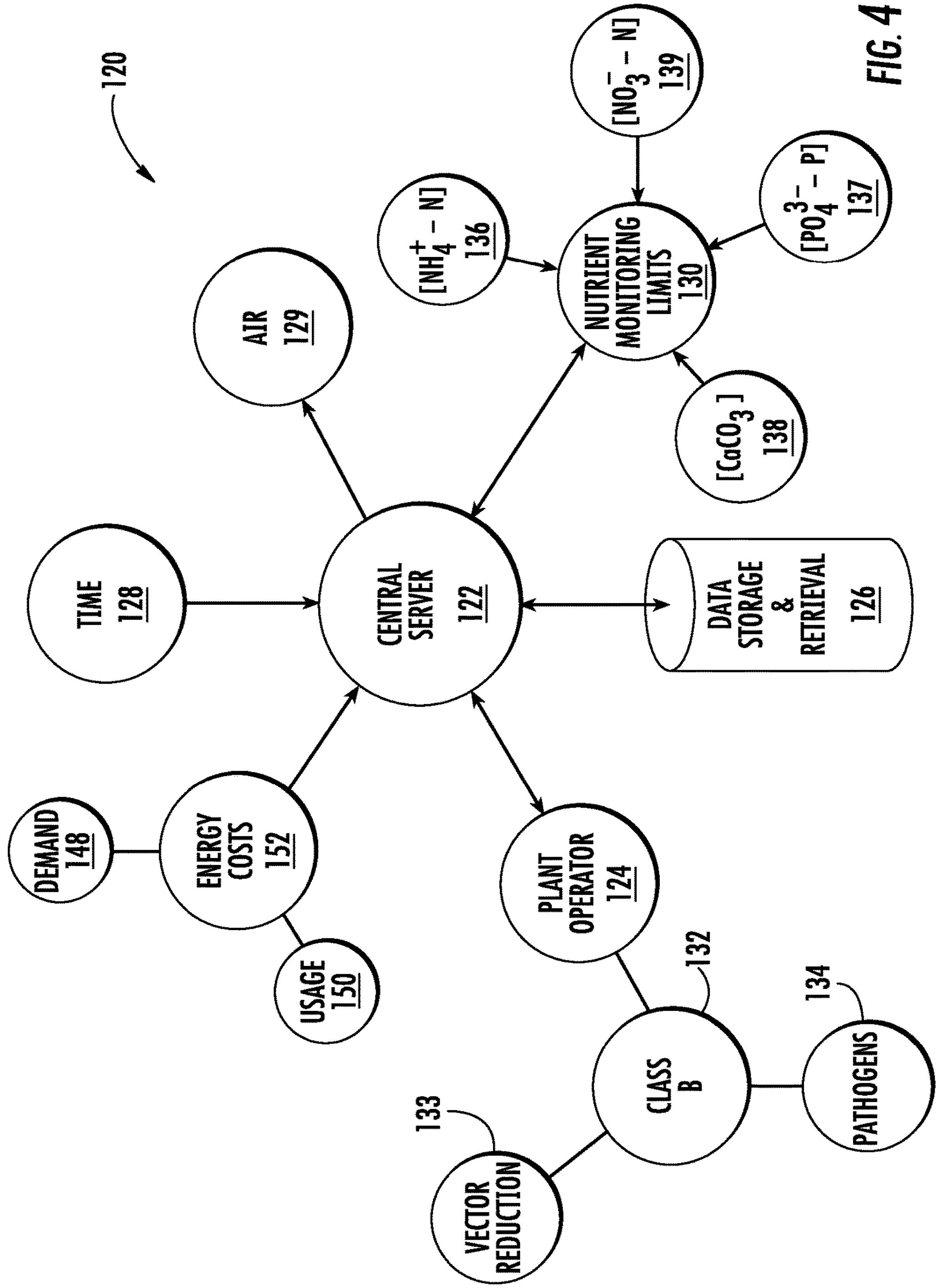
FIG. 4 illustrates in a modified hub and spoke diagram the global relationships among the principal functions of the control system of the invention, with reference to FIGS. 2, 3, and 5 through 14.

Turning now to the control system of the invention, FIG. 4 illustrates generally at 120 the principal functions of the control system. The control system functions report to and are controlled by a central interface server 122. Central server 122 includes an operator interface 124 for manual inputting of set points and including manual control of the system functions; an on-demand data storage and retrieval system 126 for data obtained by the central server from the various control system monitoring functions; a cycle time monitor and control system 128 to separately track and control through the central server 122 the anaerobic, aerobic, dewatering and optional anoxic cycle times in response to set points for maximum cycle time; a controller 129 for precisely controlling mixing and the supply of oxygen to the microorganisms in the digester; and, the heart of the system, a nutrient monitoring and control system 130 to separately track and control a plurality of nutrient monitoring functions and working with the central server to precisely control air to the digester.

It should be recognized that monitoring Class B biosolids standards 132 ("Class B standards" or "Class B") is at present obtained by the operator from a laboratory analysis of vector reduction 133 and pathogens 134. The operator can input the Class B results into the central server for control functions responsive to Class B. Nutrients 130 optionally are continuously monitored throughout or only in the cycle of interest in which a particular nutrient exercises a control function. Alternatively, the nutrients may be monitored manually and occasionally as needed or continuously or through some combination of these methods. The concentration of ammonium nitrogen [$NH_4^+$—N] at 136 is monitored for maximum concentration in the anaerobic cycle and to determine the degree of reduction in organic carbonaceous materials. The concentration of ammonium nitrogen [$NH_4^+$—N] at 136 is also monitored for minimum concentration in the aerobic cycle. The concentration of orthophosphate phosphorous, [$PO_4^{3-}$—P] at 137 is monitored for minimum concentration during the aerobic cycle and for re-release in the dewatering cycle. Soluble alkalinity 138, here illustrated as the concentration of soluble calcium carbonate, is not in itself a nutrient, but is included here in connection with nutrient monitors 130 because it is similarly monitored and is monitored for end point concentration, meaning the end of availability of soluble alkalinity to drive significant further reduction in the nutrient [$PO_4^{3-}$—P]. Considering yet additional nutrients, if the optional anoxic cycle is initiated, then reduction of nitrate nitrogen, $NO_3^-$, is monitored against a minimum for initiating dewatering.

It is important to note that what is useful to monitor is the reactive species of phosphorous or alkalinity in WAS, which is the species that can be impacted by the practice of the invention, which uses the reactivity of the phosphorous and alkalinity to drive precipitation of the reactive phosphorous into a solid form, which precipitate is adsorbed onto the biosolids and withdrawn from the plant in dewatering. The digester side stream returned to the influent typically contains an insignificant amount of reactive phosphorous species.

The reactive phosphorous species is normally orthophosphate, which can be determined by taking a filtered sample from the digester. It is also possible to use total phosphorous in the liquid fraction, which can be determined by filtering a sample of the digester biosolids and then acidifying the filtered sample to drive the equilibrium to the orthophosphate ion species. Total phosphorous is not as practical as determination of reactive species concentration because the majority of the phosphate ion species is present as orthophosphate anyway. It is important to recognize that in the context of the invention, reference to phosphorous, total phosphorous, and orthophosphate are all intended to refer to the reactive liquid-phase species subject to the control system of the invention, and does not include phosphorous in the solid phase. It is the reactive species in the digester side stream that is reduced in concentration in the digester and the solid phase species that is increased; otherwise the total amount of phosphorous essentially remains the same as in the WAS entering the digester.

Similarly, it is the reactive alkalinity, normally, although not exclusively, from ions in solution in the liquid phase of calcium carbonate, $CaCO_3$, namely $Ca^{2+}$ and $CO_3^{2-}$, which we have called for convenience "soluble alkalinity" and the concentration of "soluble $CaCO_3$ alkalinity," "[$CaCO_3$]," that is reactive with the reactive phosphorous species $PO_4^{3-}$. Soluble alkalinity is most easily and efficiently determined in accordance with the invention inline in the WAS in the aerobic phase in the digester. As for phosphorous, it is important to recognize that in the context of the invention, reference to alkalinity, total alkalinity, and soluble alkalinity are all intended to refer to the reactive liquid-phase species subject to the control system of the invention, and does not include alkalinity in the solid phase. It is the reactive species in the digester that is reduced in concentration in the digester by the precipitation of phosphorous and the solid phase species of the precipitate that is increased.

It is important to note that either an orthophosphate analyzer or a soluble calcium alkalinity analyzer, or a combination of the two, can be used to monitor orthophosphate reduction in the WAS in the aerobic phase. The invention relies on the availability of calcium carbonate to drive bio-solids uptake of phosphate during the aerobic cycle. The uptake of phosphate is driven by soluble calcium alkalinity because organic acids and bicarbonates are stripped out of the WAS as carbon dioxide gas once the anaerobic cycle is completed and aeration is initiated. Orthophosphate reduction stops when the soluble calcium alkalinity drops to about 20 ppm or less. In some treatment plants, conditions may occur in which the level of soluble calcium alkalinity is insufficient to provide significant soluble phosphorous precipitation. Insufficient levels of soluble calcium alkalinity can occur when the plant influent receives a low-calcium load, which can have a negative impact on the ability of the process to uptake soluble phosphorous into the WAS for disposal, potentially allowing high soluble phosphorous concentrations in side stream 60' eventually to build up in the BNR reactor 26'. Plants so impacted may not achieve soluble phosphorous levels below about 20 mg/l in the digester side stream. If low soluble phosphorous side stream levels are desired, the plant could add a lime feed system to the digester to add hydrated lime during the anaerobic cycle to the WAS to increase the calcium content of the WAS and drive increased soluble phosphorous precipitation. In the practice of the invention, we have determined that a useful ratio of soluble calcium carbonate to orthophosphate ratio is typically≥about 3:1, which is to say at least three times more soluble alkalinity than soluble phosphorous, normally determined in mg/l.

Lime has been determined to be a useful chemical addition to the digester in the circumstances above described. The control system determines the appropriate lime feed rate based on prior monitored concentrations of soluble orthophosphate in the side stream 60'. Other alkalinity additions may be used instead or in addition, including, for example, magnesium hydroxide or sodium bicarbonate, although not necessarily with equivalent results. Magnesium hydroxide and sodium bicarbonate do not drive soluble phosphorous precipitation directly, but instead react with nitrifying acids produced during the aeration process. By reacting with the nitrifying acids, these other forms of alkalinity preserve more of the available soluble calcium alkalinity to react with the orthophosphate rather than being consumed by the acids.

The central server controls the mechanical equipment 129 for initiating and maintaining the aerobic cycle 104, the minimally aerobic dewatering cycle 108, and for methane-bacteria destroying bursts during the anaerobic cycle 102, including mixers and blowers or aerators, or both, typically in an on/off fashion. If desired, the energy costs 152 of aerating the sludge can be monitored through power demand 148 and power usage 150 for the blowers, aerators, and mixers that are monitored and an energy cost 152 calculated. The monitored energy costs for use of the system of the invention can be compared to the energy cost for aerobic treatment in prior processes to determine one aspect of the value of the system of the invention.

Monitors 148, 150 determine from the mechanical equipment the amount of energy demanded 148 and the energy used 150, respectively, and process energy costs 152 are calculated from this data for the aerobic cycle, which costs are provided to the central server 122 and can be used to determine system efficiency and cost savings as compared to operating the blowers, aerators, and mixers in the absence of the control system of the invention.

Figure 5:
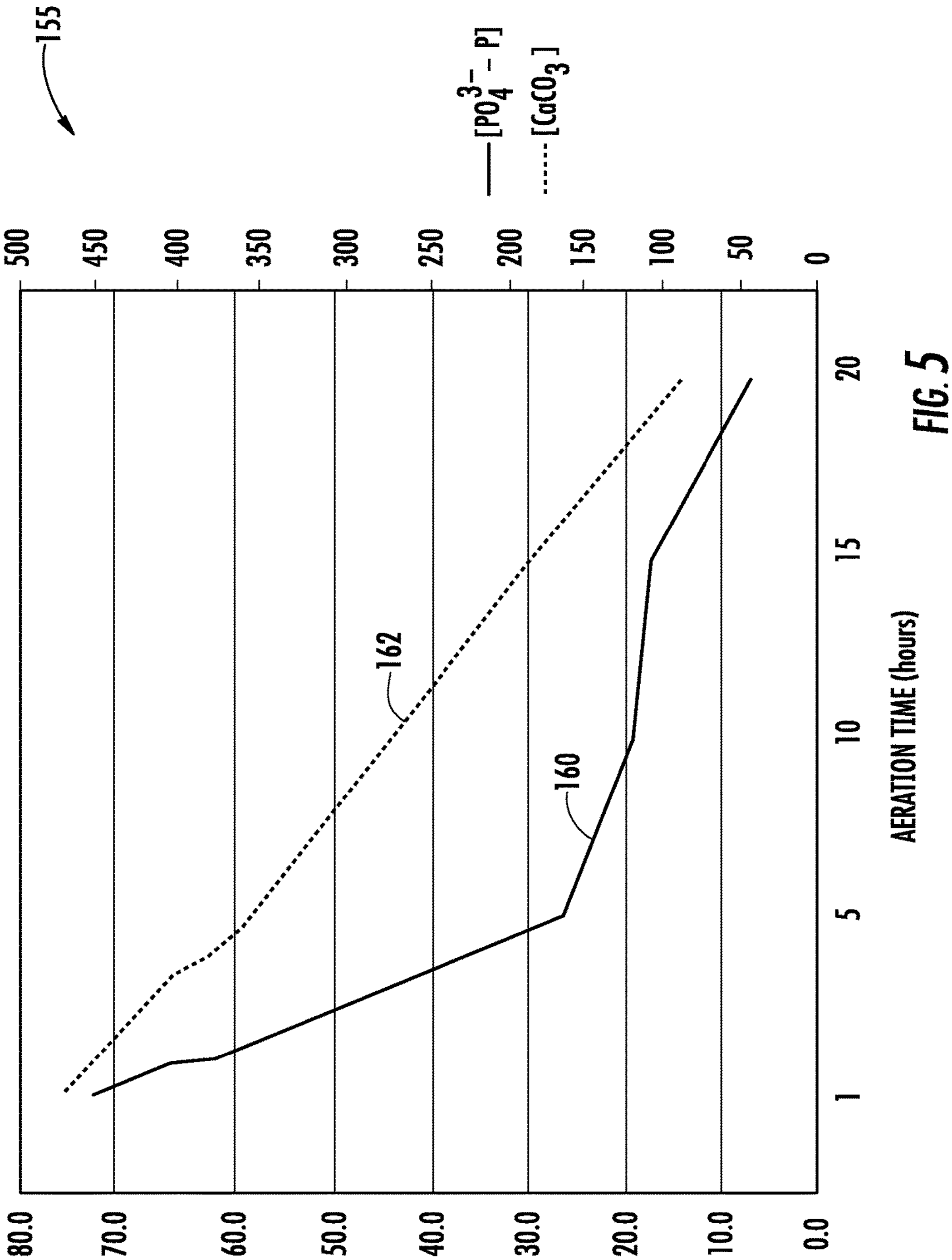
FIG. 5 graphically illustrates the decrease of orthophosphate phosphorous $PO_4^{3-}—P$ over time driven by and correlated with the decrease in calcium carbonate $CaCO_3$ soluble alkalinity in the waste activated sludge in the digester.

Turning now to FIG. 5 and consideration of the reduction of orthophosphate phosphorous concentration, $[PO_4^{3-}—P]$, in the waste activated sludge during the aerobic cycle, which is one of the principle advantages of the invention, FIG. 5 illustrates generally at 155 the near linear relationship between consumption of soluble alkalinity and reduction of orthophosphate. Curve 160 is a plot of $[PO_4^{3-}—P]$ against aeration time and shows its reduction from a maximum of about 72 mg/L to about 7.5 mg/L over a twenty hour period. The presence of soluble alkalinity drives orthophosphate precipitation and adsorptive uptake onto the biosolids as is illustrated in curve 162. Curve 162 is a plot of soluble alkalinity determined as [soluble $CaCO_3$] against aeration time and shows its reduction from a maximum of about 475 mg/L to about 80 mg/L over the same 20-hour period as for $[PO_4^{3-}—P]$. $CaCO_3$ concentrations are consumed during the aerobic cycle 104 (FIG. 3) by nitrification, which competes with calcium precipitation. Thus, the end point in the reduction of the concentration of orthophosphate, determined as a concentration of soluble alkalinity [soluble $CaCO_3$]≤about 20 ppm, provides a useful parameter 138 (FIG. 4) for monitoring by the control system to determine whether to end the aerobic cycle or not if the aerobic cycle time, T-$O_{max}$, has not been exceeded and $[NH_4^+—N]_{min}$ and optionally Class B biosolids standards have been met. Additional control can be provided by either manually or automatically determining $[PO_4^{3-}—P]$, when the soluble alkalinity end point is reached. The operator is allowed thereby to determine when the end point for orthophosphate precipitation is reached whether and how much $[PO_4^{3-}—P]$ remains in the liquid fraction. The operator can then make an informed decision whether to add more soluble alkalinity to a subsequent anaerobic cycle.

Chemical costs and costs savings are based on the amount of chemical addition required to reduce orthophosphate 137 in the digester side streams. The chemical cost savings function (not illustrated) analyses the current side stream content of orthophosphate and compares that value to previously obtained determinations of the amount of chemicals required for high orthophosphate returns in the side stream. For example, in a particular plant it may have been empirically determined prior to implementation of the system that 1.0 mg of phosphorus requires the addition of 6.0 mg of aluminum sulfate. The required phosphorous to aluminum sulfate relationship is typically determined in what is called a "jar test" for every site, individually. Of course, it should be recognized that other chemicals may be used for phosphorous precipitation instead.

Figure 6:
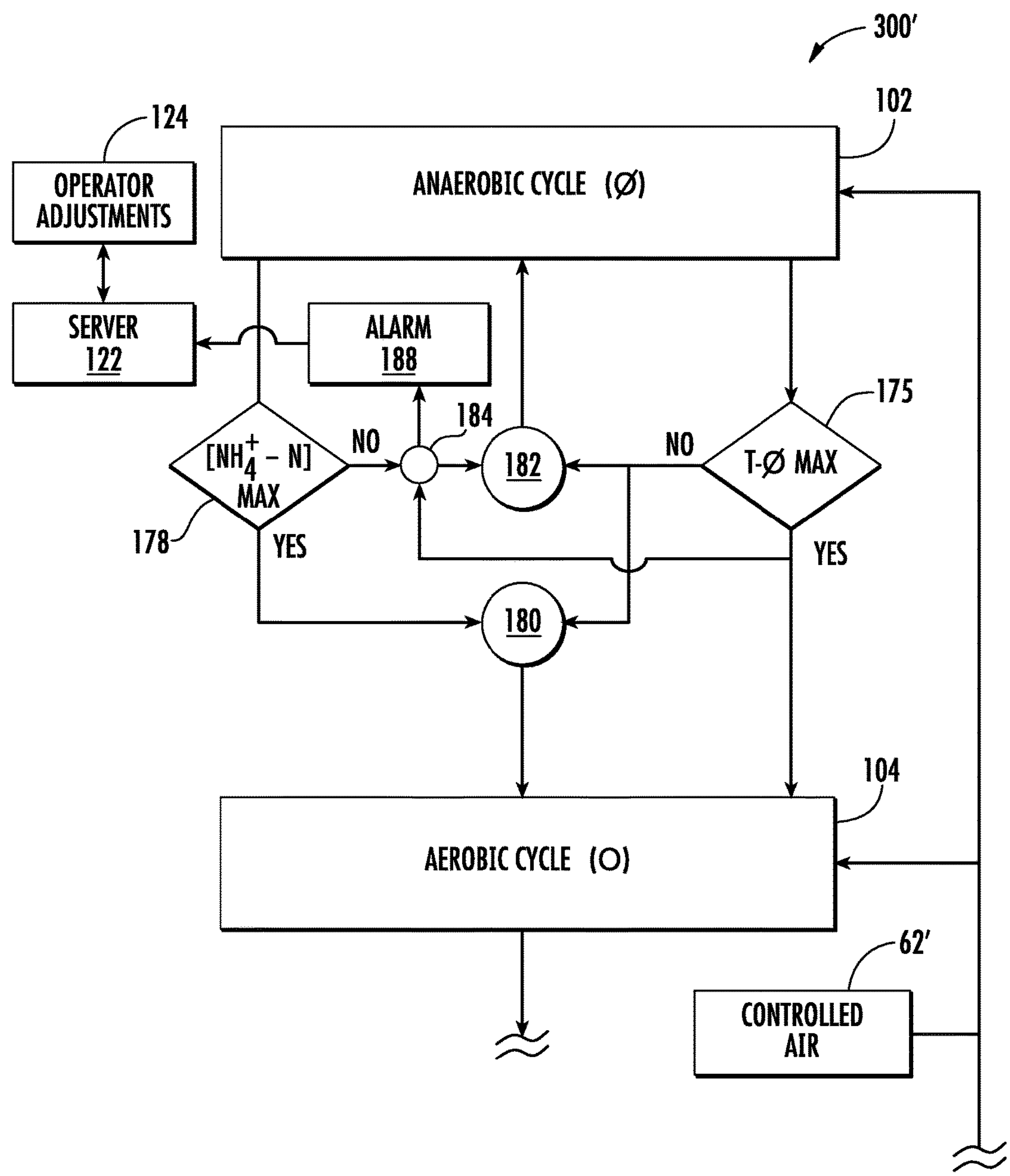
FIG. 6 illustrates in a flow diagram the sequential anaerobic (Ø) and aerobic (O) process cycles from FIG. 3 along with application of the control system of FIG. 4 to the anaerobic cycle.

Turning now to a detailed discussion of the application of the control system of FIG. 4 to the method steps of FIG. 3, FIG. 6 illustrates generally and schematically at 300 the application of the control system to the anaerobic cycle 102, which takes place under conditions without oxygen as represented by Ø. In the anaerobic cycle, the control system monitors the duration of the cycle against a maximum set point for anaerobic time, T-$Ø_{max}$, illustrated at 175. The set point is generally empirically determined as the anticipated time to reach a maximum desired production of ammonia, monitored as $[NH_4^+—N]_{max}$ as illustrated at 178, coupled with government regulations regarding minimum treatment time for reducing organic carbonaceous compounds, and is based on the WAS feed rate and the digester volume. For some plants, T-$Ø_{max}$ can be as much as forty (40) days, although in the practice of the invention, sufficient TOC reduction has occurred to meet Class B biosolids standards in the aerobic cycle in as little as six (6) days. If Class B biosolids do not have to be met, then the anaerobic cycle time can be met in as little as two (2) days.

Anaerobic cycle 102 is controlled in response to the maximum permitted concentration of ammonium nitrogen 178 that is generated during the anaerobic cycle, determined as a set point, $[NH_4^+—N]_{max}$. Anaerobic cycle 102 is also independently controlled in response to the maximum permitted cycle time, T-$Ø_{max}$, illustrated at 175. See system control functions 128 and 136 for Time and $[NH_4^+—N]$, respectively, in FIG. 4. As illustrated in FIG. 6 et seq. if the set point for $[NH_4^+—N]_{max}$ is met within the maximum permitted cycle time T-$Ø_{max}$, which is the monitoring condition at junction 180, then controlled air 62' is supplied to the waste activated sludge in the digester to initiate an aerobic cycle 104. If the set point for $[NH_4^+—N]_{max}$ has not been met, but T-$Ø_{max}$ has not yet been exceeded for the anaerobic cycle, which is the monitoring condition illustrated at the control junction 182, then the anaerobic cycle is continued. The anaerobic cycle is continued until either the set point for $[NH_4^+—N]_{max}$ has been met within the maximum permitted cycle time, which is the monitoring condition at junction 180, or the maximum cycle time is exceeded before the ammonium nitrogen set point has been reached, which is the monitoring condition at junction 184, in either of which cases air 62' is supplied to the waste activated sludge in the digester to initiate an aerobic cycle. It should be recognized that when the maximum cycle time is exceeded, then the aerobic cycle is initiated regardless of whether the maximum permitted amount of ammonium nitrogen has been generated. As illustrated by the monitoring condition at junction 184, in the event T-$Ø_{max}$ is exceeded and the set point $[NH_4^+—N]_{max}$ still is not met, then an alarm 188 informs the operator 124 of low ammonium production and inadequate biosolids hydrolysis.

Ammonia production in the anaerobic cycle is proportional to the reduction in total organic carbonaceous compounds ("TOC") in the WAS. Determining the ammonium nitrogen concentration continuously throughout the anaerobic cycle allows calculation of the reduction in TOC that occurs in the WAS in the anaerobic cycle. The ratio of the amount of ammonia produced during the anaerobic cycle, measured as $[NH_4^+—N]$, to TOC is dependent on influent waste water and WAS conditions and is site specific for every waste water treatment plant. Normally, the ratio should need to be determined only about once or twice each year, but variable conditions in the digester sludge can require more frequent determinations. For example, WAS that has been through the BNR reactor and clarified, termed "secondary sludge," usually provides consistent characteristics and is suitable for calculating an accurate reduction in TOC. However, if primary sludge is piped to the digester, which is taken from settling of the plant influent to remove floating objects and oils and greases and has not yet been treated in the BNR reactor (not illustrated in FIGS. 1 and 2), or a mixture of primary and secondary sludges enters the digester, then the sludge characteristics can vary so much that the calculation of the ratio of ammonia production to TOC is inconsistent or inaccurate. The ratio also varies with the seasons as sludge temperature changes, particularly in colder conditions.

Thus, once a determination for this ratio is reached, say 1.0:0.7 is typical for a particular plant, then the monitored ammonia production in the anaerobic cycle 102 can be multiplied by the factor for reduction in TOC, 0.7 in the exemplified ratio, to indicate TOC reduction. For a monitored value of $[NH_4^+—N]$ of, say 50 mg/l, then TOC has been reduced by approximately 35%. Thirty-five percent TOC reduction provides a relatively precise indication to the plant operators that Class B or other applicable biosolids standards are likely to be met in laboratory tests. Typically, at least a 30% reduction in TOC is required to meet Class B bio-solids standards.

In the anaerobic cycle, organic compounds are broken down and are hydrolyzed, creating an environment favorable to the bacteria that form methane. Accumulations of methane are undesirable because of its potential for a hazardous explosion and the practice of the invention is advantageous in its ability to eliminate a considerable portion of methane production that can otherwise occur in a conventional operation. To further limit methane production, the practice of the invention can be enhanced to take advantage of the sensitivity to air of the methane-producing organisms. An enhanced method for limiting methane production is to interrupt the anaerobic cycle by providing controlled air 62' to disrupt the methane-producing bacteria, but not so much as to significantly disturb anaerobic conditions. In the practice of the invention, methane-producing bacteria can be significantly reduced by adding up to 4 (four) aeration bursts per day to the anaerobic cycle of from about 2 (two) to 15 (fifteen) minutes each. The addition of small aeration bursts during the anaerobic cycle destroys a significant portion of the methane-forming organisms and also generally reduces odors significantly, if odors are of concern, and in the absence of significant disruption of the anaerobic cycle.

Figure 7:
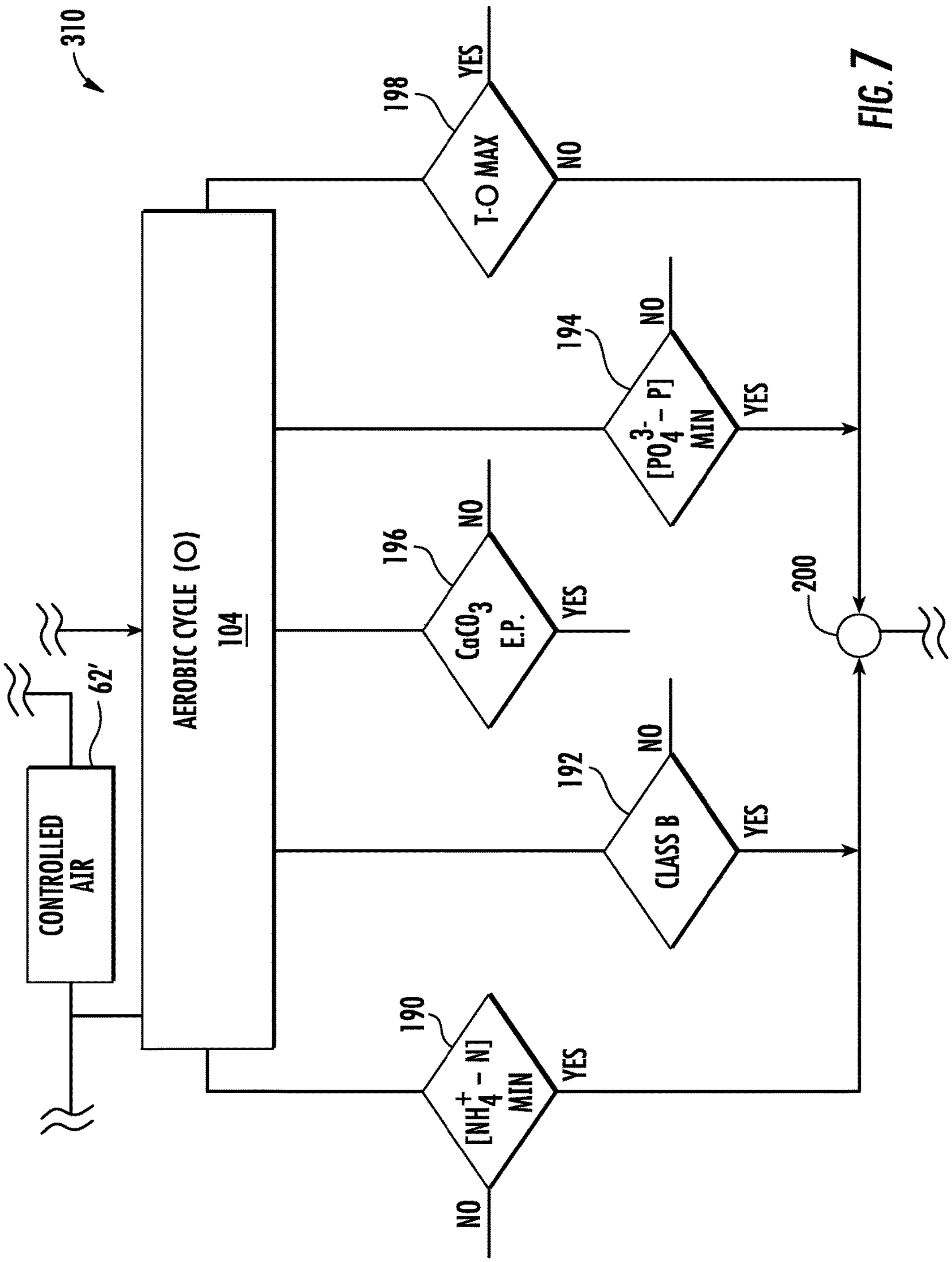
FIG. 7 illustrates in a flow diagram the application of the control system of FIG. 4 to the aerobic cycle of FIG. 3 wherein cycle time ($T\text{-}O_{max}$) has not been exceeded and all of the other monitored parameters have been met for oxidation of ammonium nitrogen $[NH_4^+—N]_{min}$, for Class B biosolids standards, and for reducing the concentration of orthophosphate phosphorous $[PO_4^{3-}—P]_{min}$ and the process progresses to either the optional anoxic cycle (AN), FIG. 3, or the dewatering cycle (D), FIG. 3.

Turning now to the application of the control system to the aerobic cycle, FIG. 7 illustrates generally at 310 the application of the control system to an aerobic cycle 104 in which set points for all three monitored parameters of minimum ammonium nitrogen concentration $[NH_4^+—N]_{min}$ 190, optional Class B bio-solids standards 192, and minimum soluble phosphorous $[PO_4^{3-}—P]_{min}$ 194 are met within the maximum allowable aerobic cycle time, T-$O_{max}$ 198. Generally, T-$O_{max}$ is limited to ≤40 hours to avoid increasing the phosphate concentration in the liquid phase. It should be understood that the set point $[NH_4^+—N]_{min}$ at 190 (FIG. 7) is for the minimum amount of ammonium nitrogen desired in the digester side stream 60', FIG. 2, not to be confused with the maximum ammonium nitrogen production desired in the anaerobic cycle, $[NH_4^+—N]_{max}$ at 178. Similarly, $[PO_4^{3-}—P]_{min}$ refers to the set points 194 for the reduction of soluble phosphorous. In that context, the set point for $[PO_4^{3-}—P]_{min}$ is for the maximum amount of soluble phosphorous desired in the digester side stream 60', FIG. 2, for return to the head works 23. Set point 196 refers to consumption of soluble alkalinity to the end point for reduction in $[PO_4^{3-}—P]$.

In contrast, depletion of soluble alkalinity to the end point indicates that no more soluble phosphorous can be precipitated. In FIG. 7, we illustrate monitoring of the end point, but since the set points for primary controls 190 for $[NH_4^+—N]_{min}$ and 192 for optional Class B bio-solids standards, and for secondary control 194 for $[PO_4^{3-}—P]_{min}$, have each been reached within the aerobic cycle, it is immaterial whether the end point of soluble alkalinity has been reached or not. Terminating the aerobic cycle is warranted. In this regard, it can be noted that if $[PO_4^{3-}—P]_{min}$ has been met within the cycle time, it is highly unlikely that the end point of soluble alkalinity would have been reached.

Figure 10:
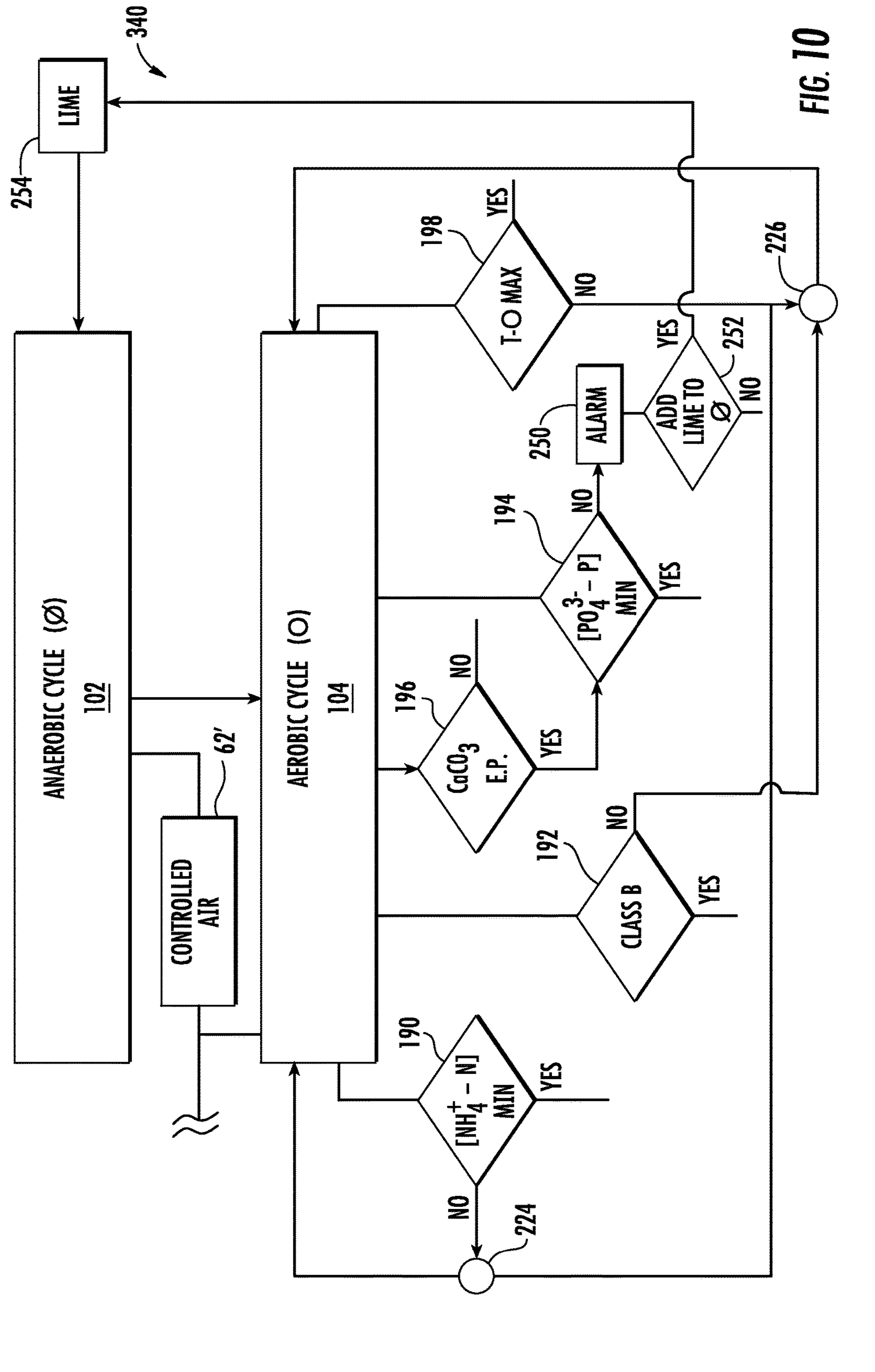
FIGS. 10 through 14 illustrate flow diagrams for the application of the control system of FIG. 4 to the aerobic cycle (O) of FIG. 3 for over a dozen scenarios of operation of a digester in accordance with the invention, namely.
Figure 11:
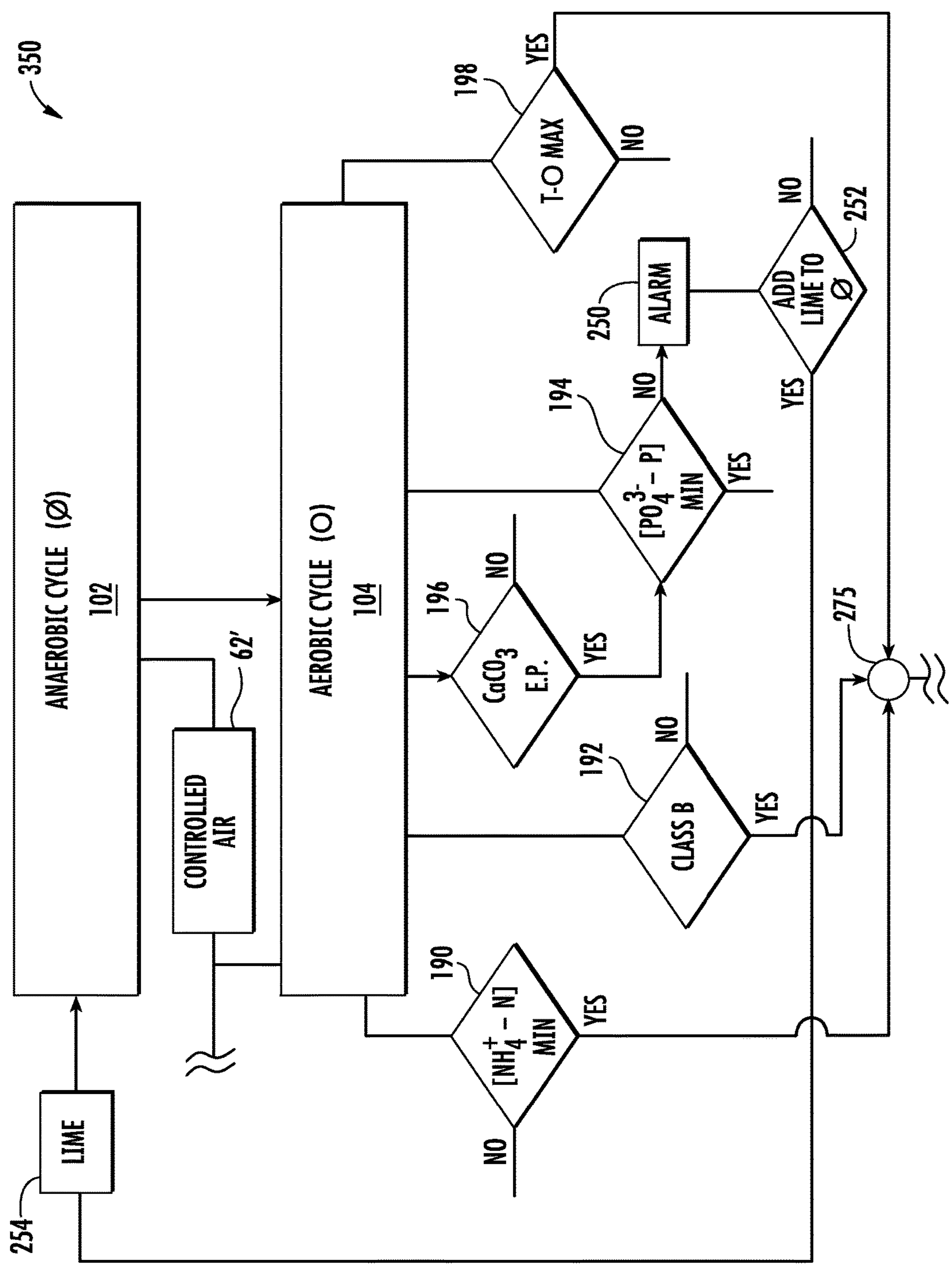
Figure 12:
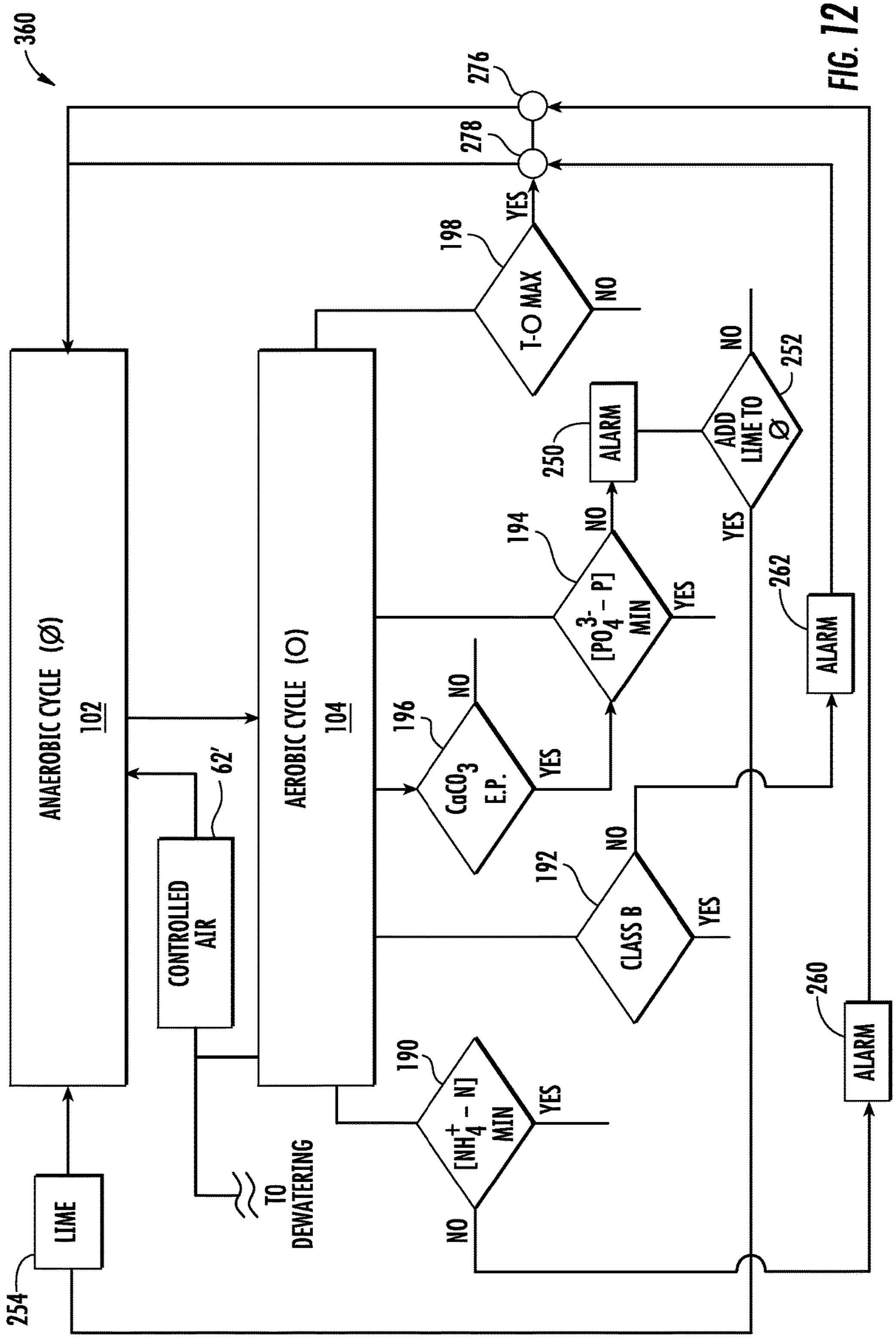
Figure 13:
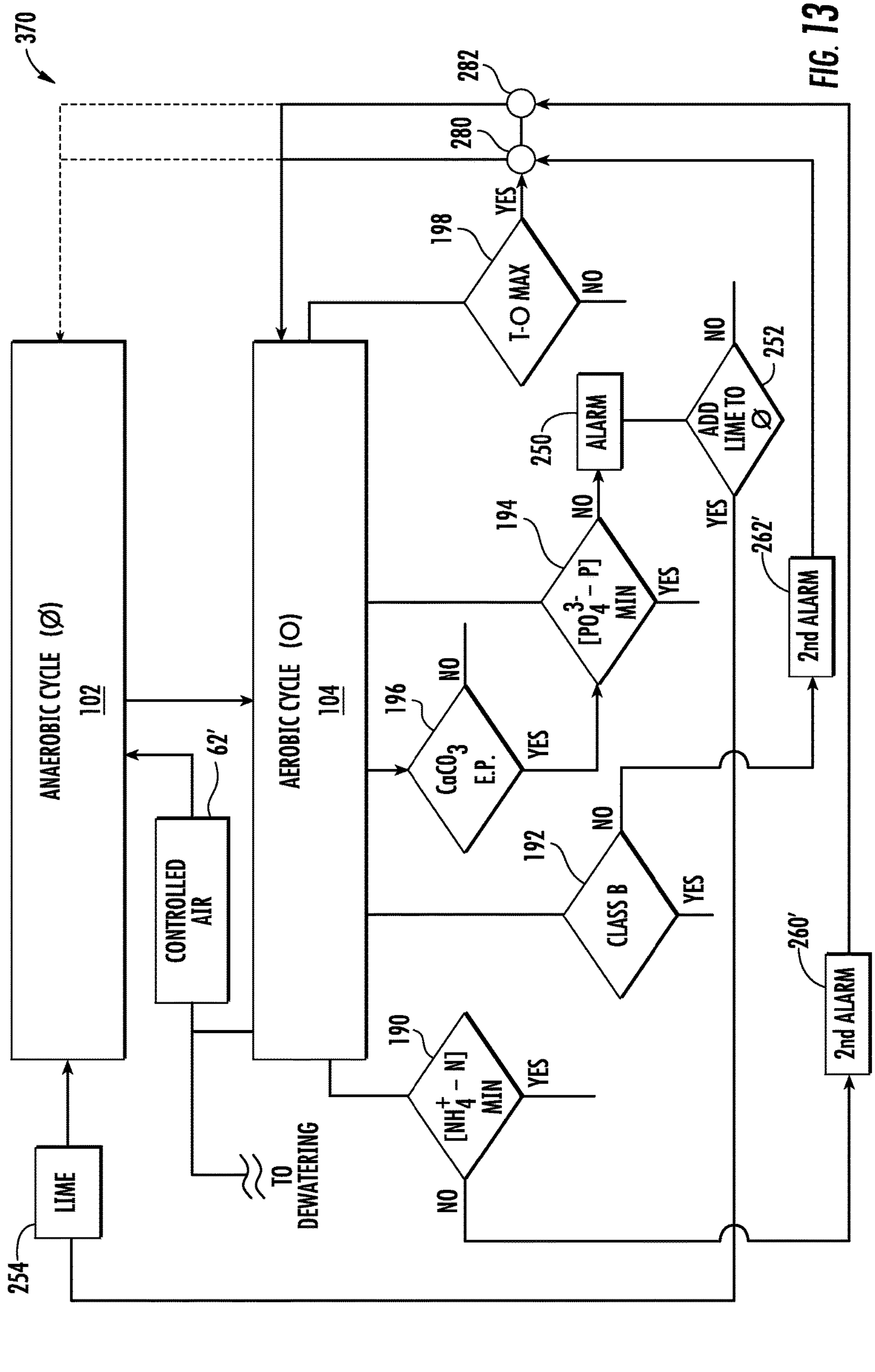
Figure 14:
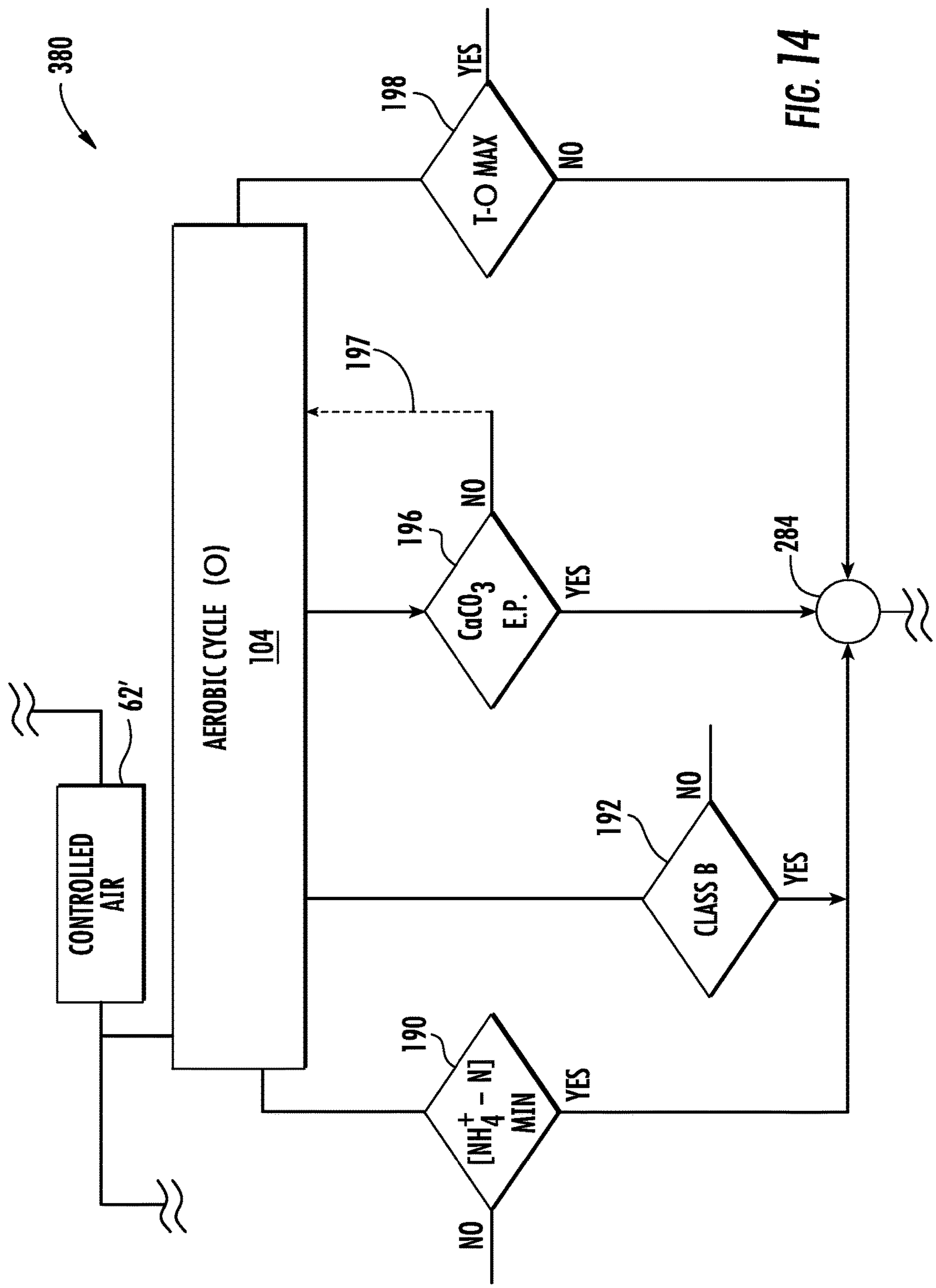
Figure 15:
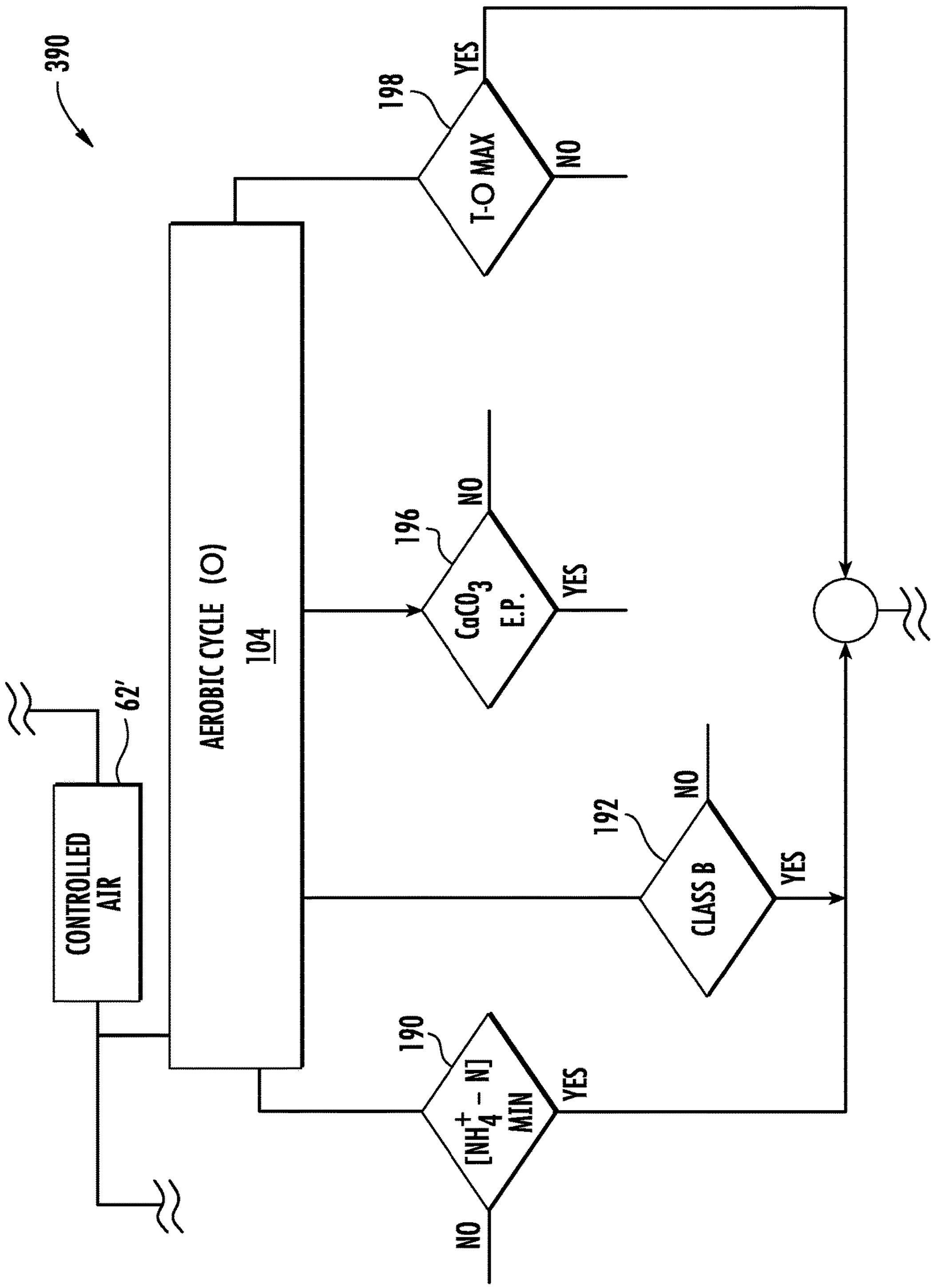
FIG. 15 corresponds to FIG. 14 and illustrates application of the control system of FIG. 4 to the aerobic cycle (O) of FIG. 3 wherein cycle time ($T\text{-}O_{max}$) has been exceeded, the end point for the reduction in concentration of calcium carbonate $[CaCO_3]$ soluble alkalinity may or may not have been met, as the case may be, the set point is not monitored for orthophosphate phosphorous $[PO_4^{3-}–P]_{min}$, and the set points have been met for oxidation of ammonium nitrogen $[NH_4^+—N]_{min}$ and for Class B biosolids standards. Under these circumstances, since cycle time has expired, the aerobic cycle progresses to either the optional anoxic cycle (AN), FIG. 3, or the dewatering cycle (D), FIG. 3, as the case may be, regardless of whether the end point of soluble alkalinity has been met or not.

Meeting the set points within cycle time is illustrated in FIG. 7 by arrows proceeding from the monitors 190, 192, 194, and 198 to the monitoring condition at control junction 200 for all four parameters that signals the digester to begin the optional anoxic cycle 106 or go directly to the dewatering cycle 108, depending on the plant configuration. The control of aeration in the aerobic cycle, which involves the interaction of from three to five parameters, is further illustrated below for over a dozen scenarios in connection with FIGS. 10 through 15. It should be recognized that multiple scenarios are depicted in some of the drawings and the reader should rely on the detailed description when considering the drawings to separate the scenarios. Conditions that favor dewatering or an anoxic cycle followed by dewatering are illustrated in FIGS. 11, 14, and 15, in addition to FIG. 7. Conditions that require continuing the aerobic cycle or initiating anaerobic conditions and starting over are illustrated in FIGS. 10, 12, and 13.

Figure 8:
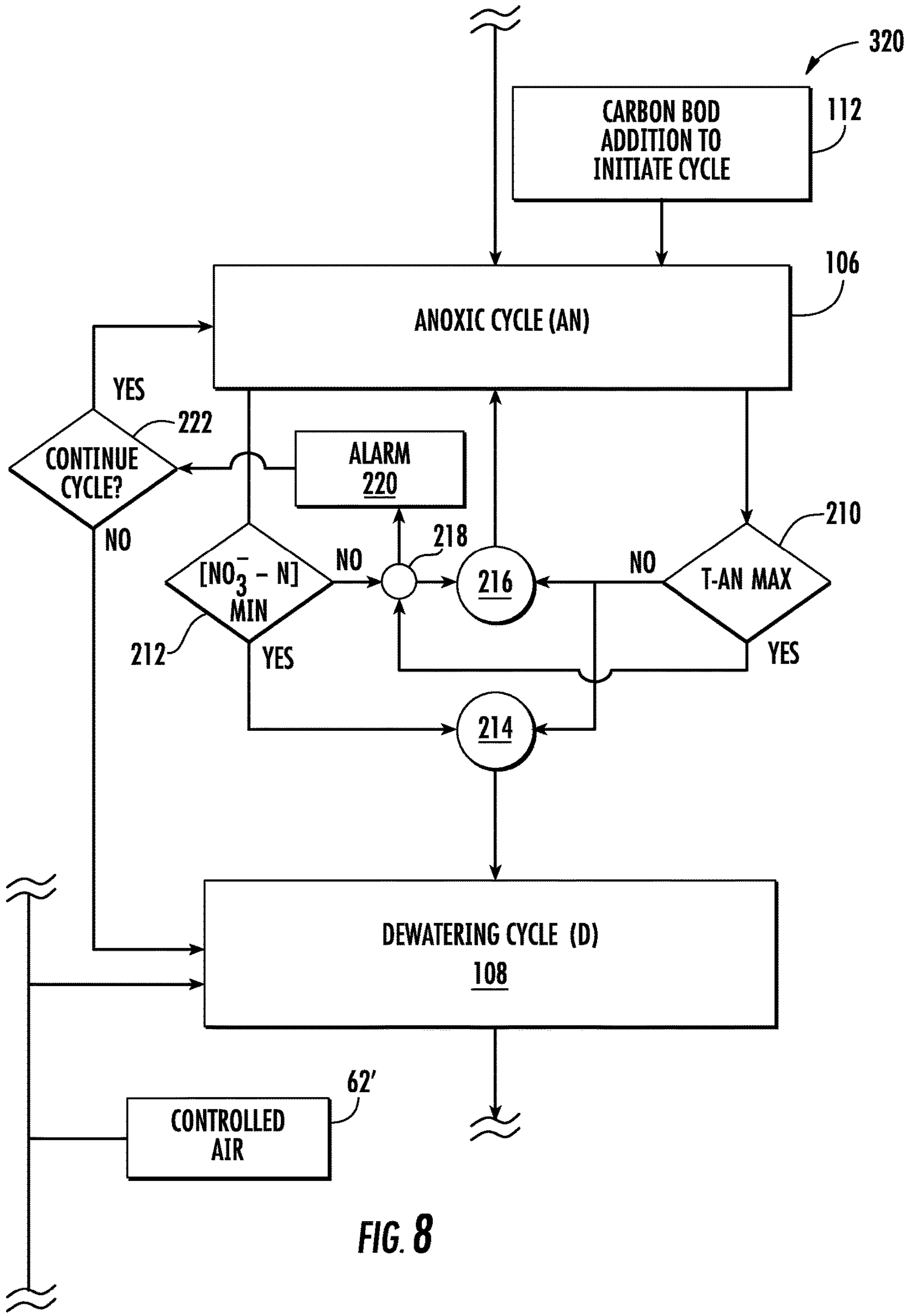
FIG. 8 illustrates in a flow diagram the sequential anoxic (AN) and dewatering (D) process cycles of FIG. 3 along with application of the control system of FIG. 4 to the anoxic cycle.

Continuing to follow the outline of process steps set forth in FIG. 3, FIG. 8 illustrates generally at 320 the application of the control system of the invention to the optional anoxic cycle 106. Air is not provided to the digester to initiate the anoxic cycle. Instead, the value for [$NO_3^-$—N] obtained at the beginning of the anoxic cycle or the end of the aerobic cycle determines the amount of carbonaceous biological oxygen demand 112 ("CBOD") that is to be used by the facultative microorganisms for reductive denitrification of nitrates, $NO_3^-$. The conditions initially at least are actually mixed aerobic and anoxic until all the dissolved oxygen is consumed. In anoxic conditions, only chemically bound oxygen is available for respiration, and no dissolved oxygen as there is under aerobic conditions. Anoxic reductive denitrification of nitrate nitrogen produced in the oxidative aerobic cycle produces nitrogen dioxide, $NO_2^-$, nitric oxide NO, nitrous oxide $N_2O$, and eventually, $N_2$, which is harmless nitrogen gas.

In the anoxic cycle, the control system monitors the duration of the cycle against a maximum set point for anoxic time, T-$AN_{max}$, illustrated at 210. The set point is generally empirically determined based on the anticipated time to reach a desired reduction in the concentration of nitrate nitrogen [$NO_3^-$—N], monitored as [$NO_3^-$—N]$_{min}$ as illustrated at 212, coupled with government regulations regarding stringent nitrogen requirements or taking into account particular plant operational and performance nuances. For some plants, T-$AN_{max}$ is typically ≤about twelve (12) hours.

Anoxic cycle 106 is controlled in response to the minimum concentration of nitrate nitrogen 212 that is generated during the anoxic cycle, determined as a set point, [$NO_3^-$—N]$_{min}$. Anoxic cycle 106 is also independently controlled in response to the maximum permitted cycle time, T-$AN_{max}$, illustrated at 210, and mixing in the absence of oxygen. See system control functions 128 and 139 for Time and [$NO_3^-$—N], respectively, in FIG. 4. As illustrated in FIG. 8, if the set point for [$NO_3^-$—N]$_{min}$ is met within the maximum permitted cycle time T-$AN_{max}$, which is the monitoring condition illustrated at control junction 214, then minimal air can be introduced to initiate the dewatering cycle 108. If the set point for [$NO_3^-$—N]$_{min}$ has not been met, but T-$AN_{max}$ has not yet been exceeded for the anoxic cycle, which is the monitoring condition illustrated at control junction 216, then the anoxic cycle is continued. The anoxic cycle is continued until either the set point for [$NO_3^-$—N]$_{min}$ has been met within the maximum permitted cycle time, junction 214, or the maximum cycle time is exceeded before the set point for [$NO_3^-$—N]$_{min}$ can be reached, junction 218. In the latter case, when anoxic cycle time is exceeded and the set point for reduction of the concentration of nitrate nitrogen is not yet met, then an alarm 220 notifies the operator through the server that high nitrate concentrations remain. The operator on a case-by-case basis determines whether to continue the anoxic cycle or to initiate dewatering by introducing minimal air as illustrated at 222. It should be recognized that if the anoxic cycle is continued, no further BOD is typically added to the sludge in the anoxic cycle because of the likelihood of undesirable high CBOD's in the digester side stream being returned to the influent.

Figure 9:
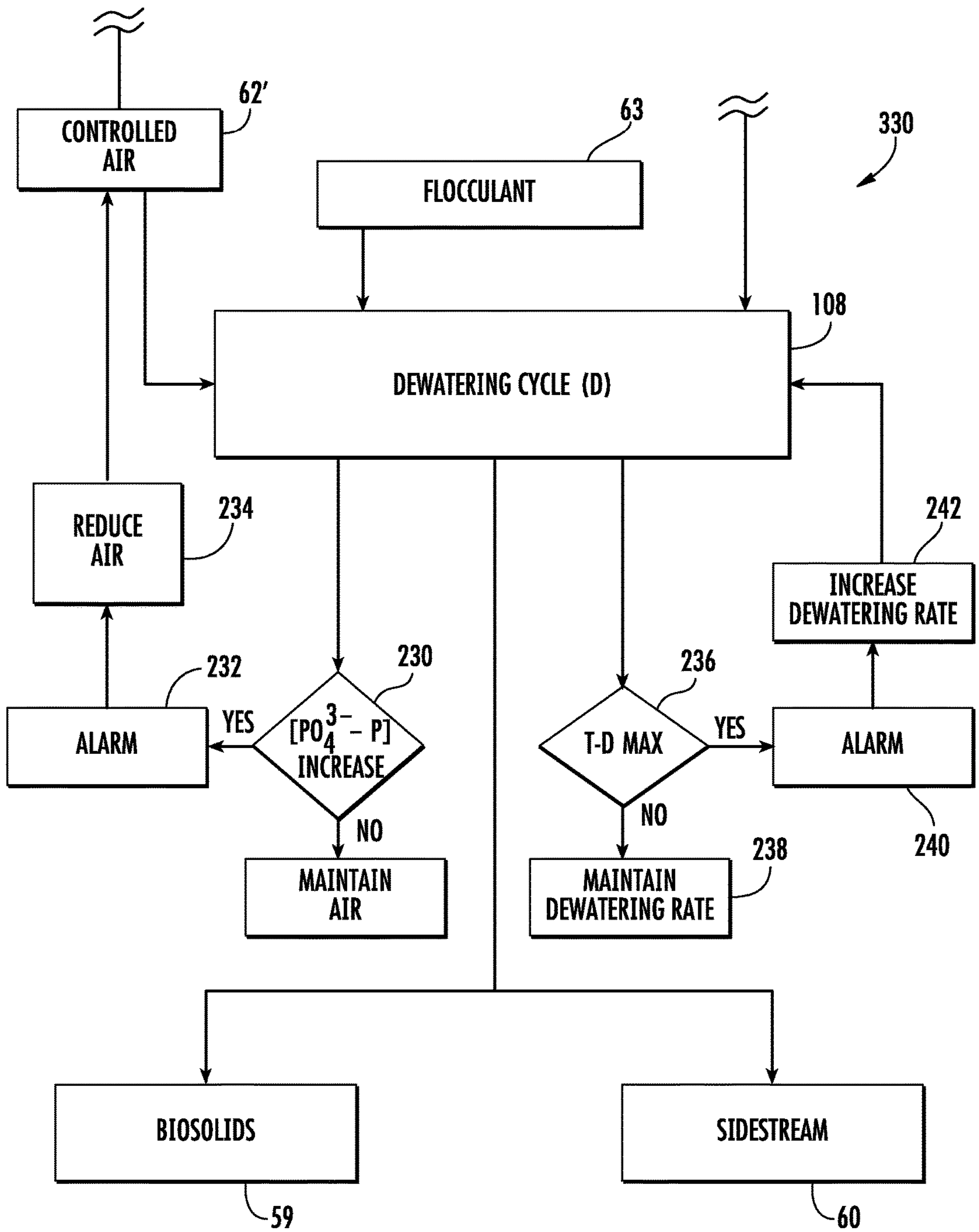
FIG. 9 illustrates in a flow diagram the application of the control system of FIG. 4 to the dewatering cycle of FIG. 3, including obtaining stabilized biosolids and a liquid sidestream for returning to the head works.

FIG. 9 illustrates generally at 330 the application of the control system of the invention to the final cycle, the mechanical dewatering cycle 108. The dewatering cycle 108 is initiated at minimal aerobic conditions either at the end of the optional anoxic cycle 106 as discussed immediately above or the aerobic cycle 104. At least the ammonium nitrogen concentration will be at or below its minimum set point and the Class B standards, if required, will be met. Desirably, the nitrate minimum set point and the minimum orthophosphate set points will be met or exceeded as discussed in connection with cycles 106 and 104, respectively. Flocculent 63 is typically added to the sludge before dewatering to assist the sludge to form flocs that can be more easily separated from the liquid fraction to form the biosolids.

Minimal aerobic conditions typically can be achieved with a diffused air flow rate that does not promote oxidative nitrification and further alkalinity reduction. A typical example of minimal aerobic conditions is approximately 4 SCFM ("standard cubic feet per minute") per 1,000 $ft^3$. Digesters with surface aerators normally incorporate separate mixing functions and are capable of reducing the surface aeration intervals, using minimal air, in the absence of inducing aerobic conditions that would release soluble phosphorous and promote nitrification if excess air is continued in the absence of sufficient soluble alkalinity buffer. It is important that as little air 62' as possible is used both to minimize cost, and more importantly, to preclude nitrification and orthophosphate from being released into the liquid fraction as soluble phosphorus during dewatering. Mixing should be provided at least when the air is turned off in the intervals between aerations to keep the bio-solids in suspension during dewatering.

The liquid fraction 60 recovered from dewatering is returned to the head works influent 22 (FIG. 2) and should still be low in nitrogen, phosphorous, and CBOD to avoid large chemical additions at the BNR reactor 26 for phosphorous removal and operational problems due to high nitrogen loading. Mechanical dewatering should not take more than five (5) days to avoid further nitrification and phosphate release. Orthophosphate release is monitored at 230 (see FIG. 3 at 137). Orthophosphate release due to over-aeration is caused by background nitrification processes that produce acids that react with the biosolids soluble alkalinity. Once all the soluble alkalinity is consumed, then the nitrifying acids react with the insoluble alkaline particles, primarily the calcium portion of the calcium phosphates, to release the phosphate portion as orthophosphate. It is useful to monitor soluble alkalinity in connection with the aerobic cycle 104 in part so that the remaining alkalinity is known when dewatering is initiated.

If monitored parameter 230 indicates phosphorous release, then the air 62' is reduced in run time until phosphorous release is no longer detected and minimal air is resumed. An alarm 232 is provided to the operator through the server and the operator can reduce the air 62' as illustrated at 234 to a point below the minimal air setting with which the cycle was initiated. Alternatively, the server can of course reduce the run time directly.

The dewatering cycle is also independently monitored with respect to maximum cycle time, T-$D_{max}$, illustrated at 236. If the cycle time is not in danger of being exceeded, the dewatering rate is maintained, 238. If however, the cycle time could exceed a maximum cycle time of about five (5) days, then an alarm 240 is provided and the operator notified to increase the dewatering rate 242 to avoid increasing the phosphate concentration in the side stream.

Dewatering produces in addition to the liquid fraction 60 that is returned to the plant influent 22' (FIG. 2) a dewatered waste activated sludge, stabilized biosolids 59, that are collected for disposal. It should be recognized that upon dewatering the digester is never completely emptied of stabilized biosolids. Approximately 20 to 40%, and typically 30% of the digester stabilized biosolids, is retained in the digester to seed the next batch of WAS from the clarifier. Class B biosolids are suitable for surface applications and can normally be applied as a nutritive fertilizer having a relatively high nitrogen and phosphorous content. The process of the invention is not generally believed to be suitable for achieving Class A standards under the EPA regulations.

Decanting is not normally necessary and, depending on when performed, may impede the benefits of the invention from being realized. Thus, decanting is not typically practiced in connection with the invention. In decanting, the liquid phase on top of the biosolids, called the supernatant, is removed from the digester, usually during the initial sludge settling phase and provided to the plant head works as stream 61 to supplement the digester side stream liquid fraction 60 obtained from dewatering. Decanting the WAS to thicken it concentrates the WAS, which can negatively impact the rate of reduction of organic compounds in the WAS as compared to a thinner sludge. If thickening is desired, then normally the WAS is thickened by decanting after the aeration cycle is completed and Class B bio-solid standards, if applicable, have been met, but prior to dewatering. Alternatively, and optionally, an anoxic denitrification cycle can be added after the aerobic cycle, if desired. In this event, decanting, if it is practiced at all, is normally not initiated until the anoxic cycle is fully complete.

If decanting occurs immediately before dewatering, it should have no negative impact on organic bio-solids reduction in the anaerobic cycle, ammonium nitrogen reduction and soluble phosphorous precipitation in the aerobic cycle, or nitrate nitrogen reduction in the denitrification cycle. However, decanting may be disadvantageous in an anoxic denitrification cycle because if denitrification is incomplete, then the side stream nitrate concentration may increase. Decanting may be disadvantageous if accomplished during the aerobic cycle because oxygen transfer in air diffusers or in surface aerators is normally more effective in thinner sludge concentrations. Decanting may be disadvantageous if it is accomplished during the anaerobic cycle because the supernatant will normally increase the ammonium, phosphorous, and TOC concentrations of the side stream.

Turning now to a discussion of specific control scenarios, FIGS. 10 through 15 each illustrate multiple aerobic digester cycles for waste activated sludge in accordance with the invention, in addition to that described in connection with FIG. 7. In each scenario, starting with whether aerobic cycle time, $T\text{-}O_{max}$ has been exceeded or not, we examine the principal control functions for ammonium nitrogen and optional Class B biosolids standards, considered independently, and the impact, if any, that orthophosphate concentration and soluble alkalinity may have on control.

FIGS. 10 through 15 illustrate various aspects of the aerobic cycle 104 (FIG. 3) in addition to that of FIG. 7, depending initially on whether the set point for maximum time, $T\text{-}O_{max}$, has or has not been exceeded. FIG. 10 illustrates generally at 340 a scenario where the maximum time $T\text{-}O_{max}$ at 198 has not been exceeded, and either of the set points for ammonium nitrogen 190 or Class B biosolids standards 192 have not been met, considered independently. It should be recognized that since Class B biosolids standards are optional and implemented only as required or desired, then in the absence of exercising the option, one could ignore the Class B set point by treating it as always met if it were built into the system. In either event, since one of the primary control standards is not met, either for ammonium nitrogen 190 or Class B biosolids standards 192, and time has not been exceeded, then the aerobic cycle is continued as illustrated by the monitoring conditions at independent control junctions 224 and 226, respectively, regardless of soluble alkalinity 196 and orthophosphate 194 concentrations. However, if the end point for soluble alkalinity 196 is met, then it is desirable, though not necessary, to determine the concentration of orthophosphate 194. If the set point for minimum orthophosphate concentration has not yet been met and soluble alkalinity is depleted, then it is desirable to provide an alarm 250 so that the operator or automated system can determine whether addition of an agent promoting soluble alkalinity is warranted as illustrated at 252, including, for example, lime or other agents, as illustrated at 254.

FIG. 11 illustrates generally at 350 a scenario for the aerobic cycle where the maximum time $T\text{-}O_{max}$ at 198 has been exceeded, and the set points for ammonium nitrogen 190 or Class B biosolids standards 192 have been met, considered independently. It should be recognized that if either of the set points for Class B biosolids standards, which are optional and implemented only as required or desired, or for ammonium nitrogen are not met, then dewatering does not yet occur, which scenario is demonstrated in FIGS. 12 and 13. In FIG. 11, since time has expired and both ammonium nitrogen and Class B biosolids standards are met, then the system proceeds via the monitoring condition at control junction 275 to either dewatering (FIG. 9) or the interim optional anoxic cycle and dewatering as described in connection with FIGS. 8 and 9. In this scenario, since time is exceeded, dewatering occurs regardless of the orthophosphate concentration or the depletion of soluble alkalinity. If orthophosphate concentration is monitored, 194, either continuously or as a result of depletion of soluble alkalinity, and is determined not to have met the minimum set point, then it is desirable to provide an alarm 250 to inform the operator that that side streams high in orthophosphate are being returned so that the operator or automated system can determine whether addition of an agent promoting soluble alkalinity is warranted as illustrated at 252, including, for example, lime, as illustrated at 254.

Typically, the minimally aerobic dewatering cycle 108 is initiated after one set of an anaerobic cycle, a subsequent aerobic cycle, and optionally an anoxic cycle, all at ambient temperatures. However, in the winter when the weather is colder, it is possible that one or more primary monitored parameters, $[NH_4^+\text{—}N]_{min}$, Class B bio-solids standards, or $T\text{-}O_{max}$ will not be satisfied after the initial aerobic cycle 104 is completed. Factors in addition to low temperatures that can potentially reduce oxic nitrification of the WAS include toxic loading of the digester with metals or a low pH event that kills a significant portion of nitrifies. Under these circumstances, the control system generates a warning to the operator that nitrification is reduced.

As illustrated in FIG. 12, if at the end of the maximum time allowed for the aerobic cycle 104 the standards are not yet satisfied at the maximum cycle time for reduction of ammonium nitrogen or, optionally, to meet EPA Class B bio-solids standards for vector attraction reduction and pathogen reduction, then the air 62' or other oxygen source is turned off and the anaerobic cycle 102 is reinitiated a second time instead of proceeding to either the optional anoxic step 106 or the dewatering step 108.

FIG. 12 illustrates generally at 360 an aerobic scenario where the maximum time $T\text{-}O_{max}$ at 198 has been exceeded, and the set points for ammonium nitrogen 190 or Class B biosolids standards 192 have not been met, considered independently. It should be recognized that since if either of the set points for Class B biosolids standards, which are optional and implemented only as required or desired, or for ammonium nitrogen are not met, then dewatering does not yet occur. Since time has expired and one or both of the ammonium nitrogen and Class B biosolids standards have not been met within the maximum permitted cycle time, then the anaerobic cycle 102 is initiated a second time as illustrated by monitoring conditions at control junctions 276 and 278, respectively, by turning off the air 62' and using air only in short bursts as necessary to limit methane production, regardless of soluble alkalinity being consumed or not and regardless of orthophosphate concentration. Alarms 250, 260, and 262 independently communicate to the operator that high orthophosphate concentrations remain after the aerobic cycle is completed, that minimum ammonium nitrogen reduction has not been met, and that Class B standards have not been met, respectively.

If the temperature of the WAS falls below about 8° C., then it is possible that the set point for minimum ammonium nitrogen will not be met even after the maximum cycle time allowed for the second or other subsequent aerobic step 104 following anaerobic step 102. If at this point, the standards for ammonium nitrogen reduction or, optionally, for Class B biosolids standards still have not been satisfied, then the operator may choose on a case-by-case basis whether to initiate a third anaerobic cycle or to continue the second aerobic cycle 104. The reductive denitrification of nitrates occurs automatically during the second anaerobic cycle and during the third and subsequent anaerobic cycles if any of these occur beyond the first anaerobic cycle. A third anaerobic cycle 102 and even continuation of the aerobic cycle 104 should be a rare occurrence, although it should also be recognized that the digester cycles can be repeated in accordance with the invention as needed. Aerobic cycle times normally never exceed forty (40) hours, which is 2½ days, and more typically are less than about thirty (30) hours.

FIG. 13 illustrates generally at 370 a scenario where the maximum time T-$O_{max}$ at 198 has been exceeded, and the set points for ammonium nitrogen 190 or Class B biosolids standards 192 have not been met, considered independently, for a second time. It should be recognized that since if either of the set points for Class B biosolids standards, which are optional and implemented only as required or desired, or for ammonium nitrogen are not met, then dewatering does not yet occur. Since time has expired and one or both of the ammonium nitrogen and Class B biosolids standards have not been met within the maximum permitted cycle time, then the operator may determine on a case-by-case basis as indicated by the independent monitoring conditions at the control junctions 280 and 282, respectively, whether to continue the aerobic cycle 104 or to initiate a third or subsequent anaerobic cycle 102 by turning off the air 62' and using air only in short bursts as necessary to limit methane production, regardless of soluble alkalinity being consumed or not and regardless of orthophosphate concentration. Alarms 250, 260', and 262' independently communicate to the operator that high orthophosphate concentrations remain, the set point for minimum ammonium nitrogen has not met, and Class B standards have not been met, respectively.

FIGS. 14 and 15 illustrate generally at 380 and 390, respectively, different aspects of a scenario in which orthophosphate concentration is not monitored and only soluble alkalinity is monitored. The soluble phosphorous precipitation endpoint is reached once the soluble alkalinity concentration falls to 20 ppm or less. This type of installation can determine the reduction endpoint for orthophosphate, but not the remaining soluble phosphorous concentration in the digester side stream 60'.

As illustrated in FIG. 14, if time T-$O_{max}$ 198 is not exceeded, then the system proceeds to dewatering if Class B 192 and minimum ammonium nitrogen 190 are met, even if the end point of soluble alkalinity 196 has been met, which is illustrated by the monitoring condition at control junction 284. The system proceeds because further aerobic treatment will not be able to reduce orthophosphate even if time remains in the cycle. However, as illustrated by the dashed line, if the end point for soluble alkalinity is not met and soluble alkalinity is not depleted, then the aerobic cycle is continued and control function 284 would be overridden until cycle time expired or the end point of soluble alkalinity was met (overriding is not illustrated). Had either one of Class B or ammonium nitrogen not been satisfied, then the aerobic cycle would be continued regardless of whether soluble alkalinity is depleted.

In FIG. 15, time is exceeded, and so the system proceeds to dewatering since Class B 192 and minimum ammonium nitrogen 190 are each independently satisfied, in the absence of knowledge of the concentration of orthophosphorous. Even though we are monitoring soluble alkalinity, we proceed even if the end point is not yet met because time is exceeded. Had either one of Class B or ammonium nitrogen not been satisfied, then the scenarios of FIG. 12 or 13 would prevail.

What is claimed is:

1. A method for digestion of waste activated sludge ("WAS") to provide stabilized biosolids comprising the steps of initiating anaerobic conditions in the sludge, initiating aerobic conditions in the sludge in response to either a predetermined maximum ammonia concentration or a predetermined maximum anaerobic time, and dewatering the sludge to provide stabilized biosolids in response to a predetermined minimum ammonia concentration and under predefined minimal aerobic conditions to substantially limit increasing the concentration of reactive phosphorous species in solution.

2. The method of claim 1 wherein the predetermined maximum and minimum ammonia concentrations are monitored as ammonium and the reactive phosphorous species in solution is monitored as orthophosphate or total phosphate.

3. The method of claim 1 further comprising the step of monitoring the reduction of vector attraction and pathogens during aerobic conditions and initiating dewatering in response to both a predetermined reduction in vector attraction and pathogens and a predetermined minimum ammonia concentration.

4. The method of claim 1 further comprising the step of dewatering the sludge under minimal aerobic conditions to substantially limit increasing the concentration of reactive phosphorous species in solution comprising the steps of providing minimal air flow or surface aeration to the WAS during dewatering, monitoring the concentration of orthophosphate or total phosphate during dewatering, and decreasing the air flow or surface aeration in the event of increase in the concentration of orthophosphate or total phosphate.

5. The method of claim 1 further comprising the steps of monitoring the concentration of reactive phosphorous species in solution under aerobic conditions and dewatering in response to a predetermined minimum ammonia concentration in the event a predetermined maximum aerobic time has not been exceeded and a predetermined minimum concentration has been reached of reactive phosphorous species in solution.

6. The method of claim 5 further comprising the step of monitoring the concentration of soluble alkalinity under aerobic conditions and determining the concentration of reactive phosphorous species in solution in response to a predetermined end point for soluble alkalinity.

7. The method of claim 5 wherein in the event a predetermined minimum ammonia concentration is met, a maximum aerobic time is met, and a predetermined minimum concentration has not been reached for reactive phosphorous species in solution, then an operator add sources of soluble alkalinity under anaerobic conditions.

8. The method of claim 1 further comprising the step of providing controlled air under anaerobic conditions to destroy methane-producing bacteria and without disturbing anaerobic conditions.

9. The method of claim 1 further comprising the steps of initiating anoxic conditions prior to dewatering, the anoxic conditions being initiated in response to a predetermined minimum ammonia concentration, and dewatering in response to one of a predetermined minimum nitrate nitrogen concentration or a maximum anoxic time.

10. The method of claim 9 wherein anoxic conditions are initiated by adding carbonaceous biological oxygen demand to the digester in response to the nitrate nitrogen concentration in the digester at the end of the aerobic conditions.

11. The method of claim 1 where the steps take from two to 48 days.

12. The method of claim 1 where the steps of initiating anaerobic conditions followed by initiating aerobic conditions are repeated multiple times, in the event that a predetermined maximum aerobic time is met and one or more predetermined setpoints for the minimum ammonia concentration and/or a predetermined reduction in vector attraction reduction and pathogens is not met.

13. A method for digestion of waste activated sludge ("WAS") to provide stabilized biosolids comprising the steps of:

a. providing facultative microorganisms in the sludge;
b. initiating anaerobic conditions in the sludge;
c. initiating aerobic conditions in the sludge in response to either a predetermined maximum ammonium concentration or a predetermined maximum anaerobic time;
d. monitoring the reduction of vector attraction and pathogens during aerobic conditions;
e. repeating steps 11(b), 11(c), and 11(d) multiple times, if in step 14(c) a predetermined maximum aerobic time is exceeded, and criteria for reduction of vector attraction and pathogens are not met, and/or the concentration of ammonium is above a predetermined minimum;
f. initiating anoxic conditions in the sludge in response to both a predetermined minimum ammonium concentration and a predetermined reduction in vector attraction and pathogens and adding carbonaceous biological oxygen demand depending on the nitrate nitrogen concentration in the sludge at the end of the aerobic conditions; and
g. dewatering the sludge in response to one of a predetermined minimum nitrate nitrogen concentration or a maximum anoxic time and under conditions to substantially limit increase in the concentration of orthophosphate.

14. The method of claim 13 further comprising the step of monitoring the orthophosphate concentration.

15. The method of claim 13 further comprising the step of monitoring the soluble alkalinity.

16. A method for digestion of waste activated sludge in a digester to provide stabilized biosolids, the method comprising the steps of:

a. providing sludge to a digester;
b. providing facultative microorganisms to the sludge;
c. monitoring the treatment time, monitoring the breakdown of organic cellular compounds, monitoring criteria for reduction of vector attraction and pathogens, monitoring the concentration of ammonium in the sludge, and the concentration of one or more of orthophosphate, total phosphorous, and soluble calcium alkalinity in the sludge;
d. treating the sludge in the digester at anaerobic conditions;
e. initiating aerobic conditions by supplying oxygen to the sludge when the concentration of ammonium is at or above a predetermined maximum at or within a predetermined maximum anaerobic time;
f. repeating, steps 14(d) to 14(e) multiple times, if in step 14(e) a predetermined maximum aerobic time is exceeded, and criteria for reduction of vector attraction and pathogens are not met, and/or the concentration of ammonium is above a predetermined minimum.
g. dewatering of the sludge at minimally aerobic conditions when the concentration of ammonium is at or below a predetermined minimum within a predetermined maximum aerobic time, provided however that either the concentration of orthophosphate is at or below a predetermined minimum or the soluble calcium alkalinity is at or below a predetermined end point concentration and the concentration of orthophosphate is either unknown or is at or below a predetermined minimum;
h. decreasing the oxygen to sludge if the concentration of orthophosphate increases during dewatering; and
i. providing stabilized biosolids.

17. The method of claim 16 wherein the concentration of ammonium is at or below a predetermined minimum setpoint within a predetermined maximum aerobic time, and the concentration of orthophosphate remains above a predetermined minimum setpoint at the predetermined maximum aerobic time, the method further comprising the steps of dewatering the sludge at minimally aerobic conditions and providing a "high phosphorous" warning.

18. The method of claim 17 further comprising the step of adding soluble calcium alkalinity to the anaerobic sludge in response to the high phosphorous warning.

19. The method of claim 17 further comprising the steps of monitoring power demand and power usage of aeration and mechanical mixing equipment for the digester and determining the energy costs of practice of the method based on power demand and power usage.

20. The method of claim 16 further comprising the steps of:

a. empirically determining the ratio of ammonium. production to total organic carbon
b. determining the final concentration of ammonium produced in the anaerobic cycle; and
c. determining the reduction in total organic carbon based on the ratio of ammonium production to total organic carbon determined in accordance with step 18(a) and the final concentration of ammonium produced in the anaerobic cycle determined in accordance with step 18(b).

21. The method of claim 16 wherein step 14(d) is from up to 2 to ≤40 days, step 14(e) is from up to 15 to 40 hours, and step 14(f) takes from up 1 to ≤5 days.

* * * * *